US009113485B2

(12) United States Patent
Chintalapudi et al.

(10) Patent No.: US 9,113,485 B2
(45) Date of Patent: Aug. 18, 2015

(54) METHOD FOR REDUCING LATENCY OF WIRELESS DATA PACKET DELIVERY

(75) Inventors: Krishna Kant Chintalapudi, Sunnyvale, CA (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 1340 days.

(21) Appl. No.: 12/428,021

(22) Filed: Apr. 22, 2009

(65) Prior Publication Data

US 2009/0323716 A1 Dec. 31, 2009

Related U.S. Application Data

(60) Provisional application No. 61/046,827, filed on Apr. 22, 2008.

(51) Int. Cl.
*H04W 4/00* (2009.01)
*H04W 74/08* (2009.01)
*H04W 84/18* (2009.01)

(52) U.S. Cl.
CPC .......... *H04W 74/0841* (2013.01); *H04W 84/18* (2013.01)

(58) Field of Classification Search
USPC .................................................. 370/310–330
See application file for complete search history.

(56) References Cited

U.S. PATENT DOCUMENTS

| 5,687,175 | A | * | 11/1997 | Rochester et al. | 370/449 |
| 5,719,868 | A | * | 2/1998 | Young | 370/436 |
| 6,490,645 | B1 | * | 12/2002 | Shahaf et al. | 710/244 |
| 6,990,317 | B2 | | 1/2006 | Arnold | |
| 7,046,166 | B2 | | 5/2006 | Pedyash et al. | |
| 7,099,654 | B1 | | 8/2006 | Tewfik | |
| 7,120,852 | B2 | | 10/2006 | Terry et al. | |
| 7,161,926 | B2 | | 1/2007 | Elson et al. | |
| 2003/0086373 | A1 | * | 5/2003 | Kronz | 370/235 |
| 2003/0174663 | A1 | * | 9/2003 | Dillon | 370/316 |
| 2005/0074025 | A1 | | 4/2005 | Shao et al. | |
| 2006/0136614 | A1 | | 6/2006 | Kakani et al. | |
| 2007/0076655 | A1 | | 4/2007 | Manjeshwar et al. | |
| 2007/0076745 | A1 | * | 4/2007 | Manjeshwar et al. | 370/448 |

FOREIGN PATENT DOCUMENTS

EP 1 631 018 A1 3/2006

OTHER PUBLICATIONS

Abramson N: "The Throughput of Packet Broadcasting Channels"; IEEE Transactions on Communications, IEEE Service Center, Piscataway, NJ, US; vol. COM-25, No. 1; Jan. 1, 1977; pp. 117-128; XP000809403; ISSN: 0090-6778; p. 118, col. 2, lines 28-36; Abstract (12 pages).

(Continued)

*Primary Examiner* — Kwang B Yao
*Assistant Examiner* — Juvena Loo
(74) *Attorney, Agent, or Firm* — Maginot Moore & Beck LLP

(57) ABSTRACT

A wireless data transmission method includes providing a plurality of radio frequency transmitters. A receiver is provided to receive transmissions from the transmitters. A data format including a plurality of transmission time slots is defined. Each of the transmitters is caused to independently select one of the time slots. The transmitters are used to transmit the transmissions to the receiver in the independently selected time slots.

4 Claims, 25 Drawing Sheets

(56) References Cited

OTHER PUBLICATIONS

Anonymous: "Extract From IEEE 802.15.4-2006 (Revision of IEEE 802.15.4-2003)—Part 15.4: Wireless Medium Access Control (MAC) and Physical Layer (PHY) Specifications for Low-Rate Wireless Personal Area Networks (WPANs)"; IEEE, [Online]; Sep. 8, 2006, XP002549467; New York, US; Retrieved from the Internet: URL:http://pddocserv/specdocs/data/standards/telecom/IEEE-standards/reading/ieee/std/lanman/restricted/>; [retrieved on Oct. 5, 2009]; (7 pages). p. 14, lines 3-5; p. 17, lines 34-36; p. 18, lines 1-3; p. 19, lines 8-9; p. 170, lines 3,4,8,9,14-16; p. 171, lines 40-44;paragraph 5.5.2.1; paragraph 7.5.1.4; figure 1, 4a,69.

Krishna Kant Chintalapudi et al; "On the Design of MAC Protocols for Low-Latency Hard Real-Time Discrete Control Applications over 802.15.4 Hardware"; Information Processing in Sensor Networks, 2008. IPSN '08. International Conference on, IEEE, Piscataway, NJ, USA; Apr. 22, 2008, pp. 356-367, XP031246724; ISBN: 978-0-7695-3157-1; (12 pages). The whole document.

\* cited by examiner

| n | m= 2 | m= 4 | m= 8 | m= 16 |
|---|---|---|---|---|
| 50 | 16ms | 8.5ms | 5ms | 3.3ms |
| 100 | 30.5ms | 16ms | 8.5ms | 5.0ms |
| 200 | 59.6ms | 30.5ms | 16ms | 8.5ms |

FIG. 15

| b, p | No of transmissions (frames) needed |
|---|---|
| p=0.999, b ≤1000 | 3 |
| p=0.99, b ≤100 | 4 |
| p=0.9, 2 ≤b ≤10 | 7 |
| p=0.9, 10 <b ≤100 | 8 |

FIG. 16

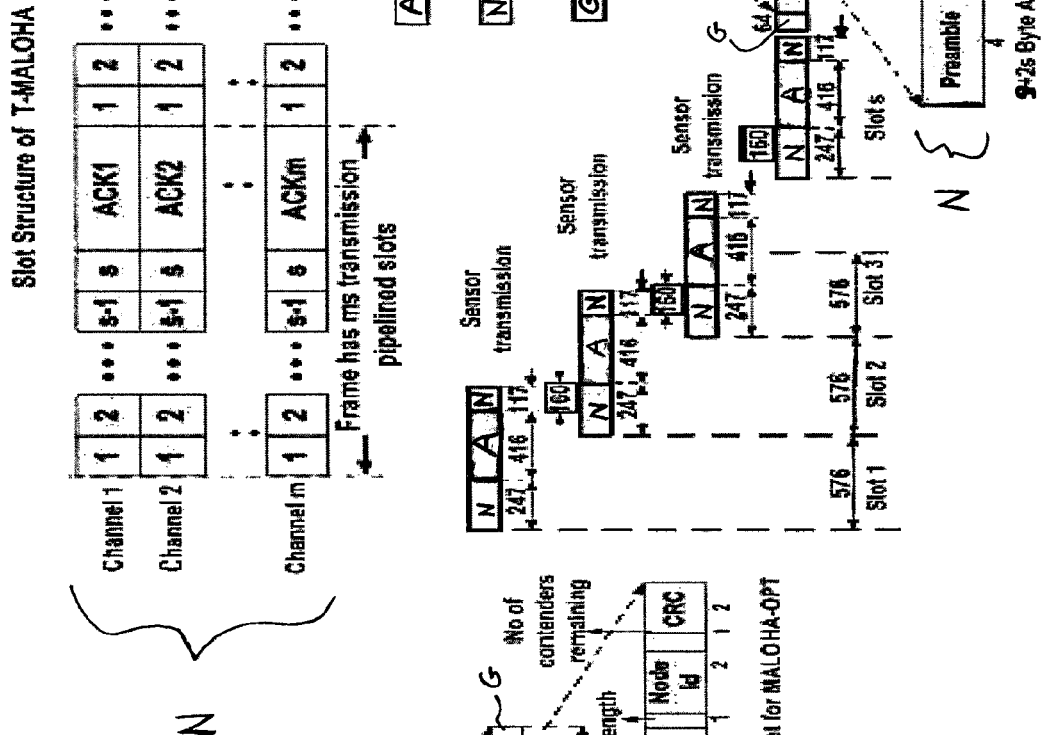
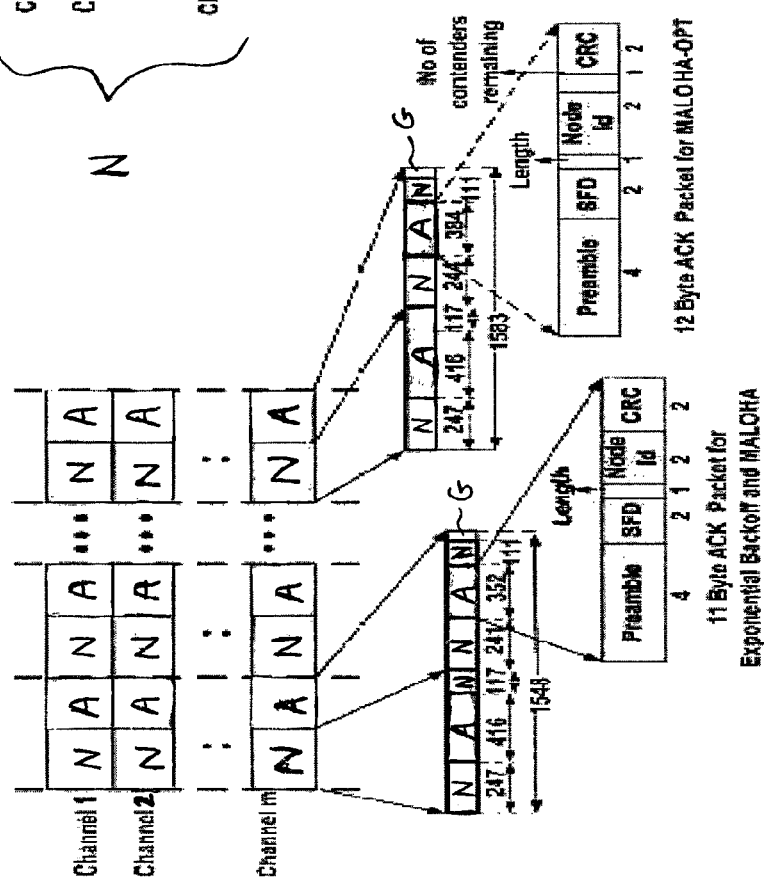
FIG. 20

METHOD FOR REDUCING LATENCY OF WIRELESS DATA PACKET DELIVERY

RELATED APPLICATION

The present invention claims priority to U.S. Provisional Patent Application No. 61/046,827, entitled "METHOD FOR REDUCING LATENCY OF WIRELESS DATA PACKET DELIVERY", filed Apr. 22, 2008, which is incorporated herein by reference.

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright © 2008-2009, Robert Bosch GmbH, All Rights Reserved.

BACKGROUND OF THE INVENTION

1. Field of the Invention

The present invention relates to a method for delivering data packets, and, more particularly, to a method for wirelessly delivering data packets.

2. Description of the Related Art

Assembly line manufacturing systems and process control plants often include control loops having several hundred sensors that continually monitor the system performance and provide feedback to a programmable logic controller (PLC). The PLC then, based on the feedback, induces the necessary control actions for controlling the systems. Most existing current day systems employ wired solutions where sensors are connected to the PLC via wires or bus systems.

The use of wireless sensors instead of wired sensors in the control loops can provide several advantages. For instance, the use of wireless sensors may significantly simplify the mechanical design of these machines and lead to more compact designs. Another advantage is that problems caused by wear and tear of cables can be eliminated, thereby leading to reduced maintenance down-time and increased production throughput. Yet another advantage of wireless sensors is that they may provide for easier installation and maintenance. A further advantage of wireless sensors is that they may bring about a reduction in unit cost due to elimination of wire/bus systems and the required associated accessories.

Discrete event control loops in modern day machines often comprise a large number of sensors (e.g., between 50 and 200) reporting to a controller. Many discrete control applications must cater to hard real-time requirements. For example, sensors must communicate the occurrence of critical events to the controller within a real-time deadline (usually between 5 and 50 milliseconds after the occurrence) specified by the control system's design requirements. Messages received after this deadline are considered lost. In the event of traffic bursts wherein several sensors may attempt to communicate with the programmable logic controller (PLC) at the same time, messages from all the sensors must reach within the specified deadline. Thus, the metric for performance in such systems is the probability that a message from all the sensors succeeds in being received at the controller within this deadline. For such solutions to be viable, the sensors must last for several years without requiring change of batteries.

The operation of several modern day control systems such as computer numerically controlled (CNC) machines, vehicles, manufacturing robot arrays, etc., are based on discrete event control. In a discrete event control system, sensors convey the occurrence of critical events (rather than sampled values of continuous physical phenomena) to a controller. The controller then, based on these sensory inputs from the sensors, induces the necessary actuation to control the system. For example, proximity sensors at a welding unit may detect and notify the arrival of a new work piece to the controller. The controller may then induce a robotic arm to pick the piece up and place it on the welding platform. In another example, some sensors may detect a possible oil/gas leak and, upon notification, the controller may require shutting down some sections of the system.

The typical modern day discrete event control based CNC machine or vehicle spans between three and fifteen meters along its largest dimension (controller to sensors) and houses between 50 and 200 sensors. For a large number of discrete event control based systems, the control loop must cater to hard real-time requirements. For example, the sensing (detection of the event), communication (sensor to controller and controller to actuator) and actuation must occur within a pre-specified deadline. Given fixed sensing and actuation delays, such deadlines can usually be translated into communication delay deadlines. A message that does not reach its destination before this deadline may cause the machine to go into an error condition that requires its temporary halting or resetting. In machines today, sensors and actuators communicate to the controller via cables and cater to hard real-time communication latencies ranging from five to fifty milliseconds depending on the specifics of the machine.

Inherent to most discrete event control systems is the unpredictable, volatile and "bursty" nature of the traffic. That is, it is difficult to predict when, how many, or which sensors will be triggered to communicate at the same time to the controller. This is because the communication is primarily event driven, and it is often impossible to predict the times and nature of occurrence of external events. In general, traffic bursts are common in most discrete event systems because i) a single event may lead to several sensors triggering at the same time, and ii) more than one event may occur at the same time or very close in time. Such event driven bursts may be referred to herein as "sensor bursts." In the event of a sensor burst, messages from all the sensors must reach the controller within the specified deadline since the controller can take appropriate action only upon receiving all the inputs. Failure of receipt of a message from even one sensor may lead to unpredictable failures in the system, forcing it into an error recovery state.

Consider a production machine of 100 sensors that produces a finished product every ten seconds. Suppose that the manufacturing of each product triggers an average of about 50 sensor burst events. A communication failure probability of one in a million translates into an expected time between failures of about two days ($10^6/(86,400\times50/10)$). A failure will lead to a decreased production throughput and hence significant financial losses. Thus, probability of failure (or, in some cases, expected time between failures) is perhaps the most important performance measure in most production systems. Failures in machines such as vehicles may lead to graver consequences including loss of life and property. Not surprisingly, in modern day machines, sensor-actuator-controller communication is conducted via communication cables, such as buses or wires carrying analog signals.

The design of present day machines requires careful deliberation for routing the cables from various locations within the machine to the controller. Eliminating the cables can not only provide the potential of enabling compact and simple mechanical designs by avoiding cumbersome cabling, but can also provide additional benefits in terms of ease of installation and maintenance. Furthermore, cables are often subject to wear and tear, especially when they are drawn from moving parts within the machine and require frequent maintenance. Each maintenance cycle translates to decreased usage and increased maintenance costs. Elimination of cable wear and tear events translate into lesser maintenance expenditure and fewer down periods. Further, the possibility of wireless sensors encourages the design of systems with a larger number of sensing points for more efficient control.

For most machines, actuators have very high power requirements. The actuators are usually expected to induce mechanical operations such as lifting a part or turning a high speed drill. Thus, actuators cannot be untethered, and require power cables to be routed to them. Making the controller-actuator communication wireless does not offer significant advantages since controller-actuator communication cables can be "bundled" up along with the power lines without significant overhead. Sensors, on the other hand, have modest power requirements, and can be made "completely wireless", operating only on batteries. Replacing batteries in hundreds of sensors in a machine, however, can be a time-consuming, labor-intensive job. Frequent battery changes resulting in maintenance downtime can offset the gains offered by a wireless sensing system. Considering that the lifetime of typical manufacturing machines or vehicles is ten years, it will be expected that wireless sensors operate for at least a few years on batteries before requiring battery replacement.

There are thus two metrics that completely capture the performance of a communication protocol for low-latency, hard real-time discrete event systems. The first metric is the probability of communication error, which may be defined as the probability that at least one sensor (among all sensors attempting to communicate in the event of a sensor burst) does not succeed in transmitting its message to the controller within the deadline. The second metric is the longevity of the system, which may be defined as the average life expectancy of wireless sensor nodes.

Existing MAC mechanisms include S-MAC, which relies on locally (topologically) synchronizing the sleep and wake up schedules of sensor nodes to increase network longevity; TMAC, which enhances S-MAC's performance under variable load traffic; DSMAC, which allows for an adaptive duty-cycling window to cater to delay-sensitive applications; WiseMAC, which uses spatial TDMA and np-CSMA, where nodes sample the channel periodically to sniff the channel based on wake up schedules that are offset to avoid collisions; TRAMA, which relies on spatial TDMA but includes an additional mechanism to avoid energy wastage due to the problem of hidden terminals not addressed in WiseMAC; DMAC, which is a MAC designed specifically for networks where sensors form a tree topology to transmit data to a base-station, and which provides both low-latencies and longevity by ensuring skewed schedules among various levels in the trees which enable children nodes to transmit exactly when parent nodes are ready to listen; SIFT, which is a contention-based MAC that uses a non-uniform probability distribution to pick transmission slots and exponentially adapts the transmission probabilities on noticing idle slots; PTDMA, which attempts to seamlessly transition between TDMA and CSMA by assigning probabilistic ownerships to slots that are adjusted based on the number of transmitters; and ZMAC, which transitions between TDMA and CSMA seamlessly but is suitable for multihop networks, unlike PTDMA which was designed with single hop networks in mind.

Communication cable-based solutions used in modern day machines typically provide error rates of one in a million or less. A wireless system that replaces an existing system only to become a performance bottleneck is not acceptable as a viable solution.

SUMMARY OF THE INVENTION

The present invention provides a method for transmitting data packets from wireless sensors to a central controller with reduced latency. In an electronic communications context, one definition of "latency" may be the time it takes for a data packet to cross a network connection from a sender to a receiver and be accurately received by the receiver.

The wireless medium access method of the present invention may be used in latency critical applications for reliably delivering data packets from several radios that intend to transmit the data packets to a single node at the same time. In a particular embodiment of the invention, radios use the IEEE 802.15.4 standard for wireless sensing in low latency, hard real-time discrete event control applications. A CC2420 radio may be used in conjunction with a medium access code (MAC) protocol to provide error probabilities of less than one in a million within deadlines ranging between five and fifty milliseconds. The invention encompasses qualitative and quantitative generalizations that can be used across other low-power radios based on the IEEE 802.15.4 standard as well. Considering that in the typical scenarios all sensors are within three to fifteen meters of the controller, only single-hop MAC embodiments may be described herein, although the invention may also encompass multi-hop embodiments. Given that MAC protocols ("MACs") are broadly classified into contention-free (packet collisions are avoided) and contention-based (packet collisions are allowed) protocols, a strawman approach may be taken to designing and analyzing the protocols systematically.

Examination of the sources of latency involved in transmitting a packet over a CC2420 radio reveals that some of the bottlenecks found in CC2420 radios are common to most low power radio platforms. According to the invention, the novel technique of transmission pipelining can be used in any time-slotted MAC protocol to increase channel utilization during a sensor burst. Multiple transceivers may be used at the controller because the controller is not power constrained. The use of multiple transceivers may allow packets from several sensors to be received at the same time over different channels, which may help relieve the bandwidth bottleneck at the controller during a sensor burst.

While the sensor traffic is unpredictable, it is often possible to assume a maximum possible burst size for a given system. For example, in a 200 sensor system, a typical number of sensors being triggered at the same time may be approximately between two and twenty sensors. As discussed in more detail below, knowledge of the maximum possible burst size may assist in design of contention-based MAC protocols that can perform better than contention-free protocols.

In one embodiment, the invention is directed to a wireless medium access protocol for reliably delivering packets from several radios that intend to transmit information to a single node at the same time for latency critical applications. Each radio that intends to transmit a packet to a controller selects a time slot randomly and independently and then transmits its packet in that selected time slot. It is possible that two or more radios coincidentally select the same time slot, which results in a packet collision that prevents any of the packets transmitted during the same time slot from being properly received by the controller. In an acknowledgement code (ACK) time slot after the selected time slots, the controller notifies the radios from which the controller has successfully received packets. The radios whose transmissions were not acknowledged as being received repeat the transmission of the packets in the next stage of time slots. In a particular embodiment, in order to increase the number of slots available in a given period of time, the controller is equipped with multiple receivers, each listening for transmitted packets on a different channel. In this embodiment, each radio randomly chooses both the channel and the time slot within the channel. Again, radios whose packets are successfully received are notified. Those radios not receiving such acknowledgement then re-select a channel and time slot and re-transmit.

The invention comprises, in one form thereof, a wireless data transmission method including providing a plurality of radio frequency transmitters. A receiver is provided to receive transmissions from the transmitters. A data format including a plurality of transmission time slots is defined. Each of the transmitters is caused to independently select one of the time slots. The transmitters are used to transmit the transmissions to the receiver in the independently selected time slots.

The invention comprises, in another form thereof, a wireless data transmission method including providing a plurality of radio frequency transmitters. A plurality of receivers are provided to receive transmissions from the transmitters. Each of the receivers is configured to receive the transmissions on a respective one of a plurality of frequency channels. A data format including a plurality of transmission time slots is defined. Each of the transmitters is caused to independently select one of the time slots and one of the frequency channels. The transmitters are used to transmit the transmissions to the receiver in the independently selected time slots and the independently selected frequency channels.

The invention comprises, in yet another form thereof, a data transmission method including wirelessly transmitting data packets from a plurality of sensors to a receiver at substantially random times. Signals are wirelessly transmitted to the sensors. The signals are indicative of whether data portions of individual ones of the data packets were received during overlapping time periods. The step of wirelessly transmitting data packets at substantially random times is repeated for ones of the sensors whose data portions were transmitted during the overlapping time periods.

An advantage of the present invention is that signals may be transmitted from a plurality of radio transmitters and received by one or more receivers with decreased latency.

Another advantage is that transmitting sensors do not need to be hard wired to the electronics with which the sensors communicate.

Yet another advantage is that low-latency performance may be provided with reliable message delivery even under conditions where packet losses and interference from external sources are common.

A further advantage is that the system is able to support traffic bursts wherein several nodes or sensors try to transmit data at the same time.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 15 is a table of frame durations for Transmission Pipelined FTDMA.

FIG. 16 is a table of the number of re-transmissions required to achieve an error rate of one in a million.

FIG. 20 is a timeline illustrating various contention free MACs, including exponential backoff, MALOHA, MALOHA-OPT and T-MALOHA.

Figure 1:
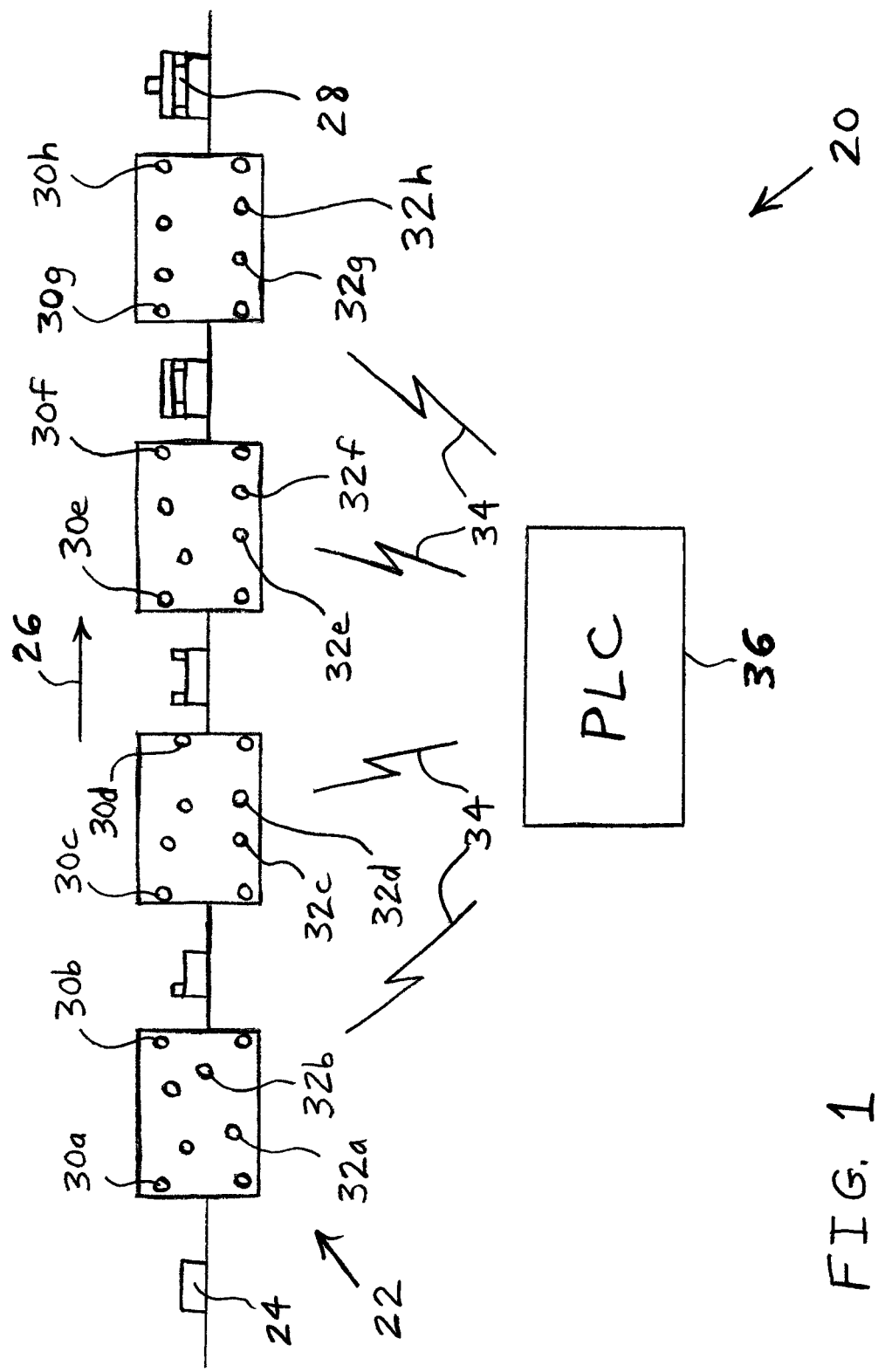
FIG. 1 is a block diagram of a sensor arrangement suitable for use in conjunction with one embodiment of a wireless data transmission method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings and particularly to FIG. 1, there is shown one embodiment of a wireless data transmission arrangement 20 of the present invention including a four stage assembly line 22. Raw work piece 24 progresses in a flow direction 26 through the four stages to become processed work piece 28. Each stage may have one or more of sensors 30a-h which may include, for example, proximity sensors to detect the presence of the work piece, and/or position and angle sensors to detect and help orient the work piece. A host of other sensors 32a-h may be provided for helping in the manufacturing process, including temperature and/or pressure sensors, for example. As indicated at 34, all of sensors 30a-h, 32a-h may include transmitters that wirelessly relay sensed information, which may be organized into data packets, to a central control unit, which may be in the form of a PLC 36.

Figure 2:
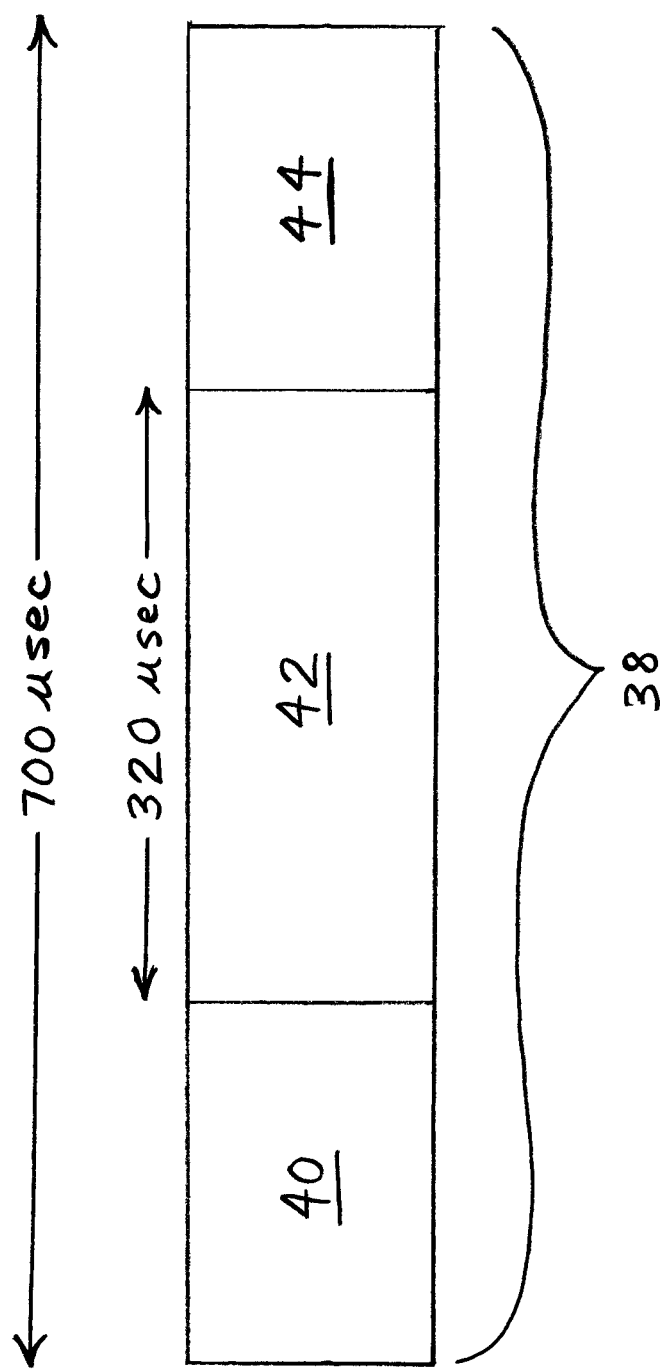
FIG. 2 is a diagram of one embodiment of a data format for use in a wireless data transmission method of the present invention.

FIG. 2 illustrates an example in one embodiment of the present invention of the software and the packet header overheads associated with a data packet transmission from a transmitter, wherein the data packet is received at the receiver. In the embodiment of FIG. 1, the receiver is included in PLC 36.

As shown in FIG. 2, a data packet 38 includes a first portion 40 for transmitter software overhead, a second portion 42 for in-the-air transmission of data bits, and a third portion 44 for receiver software overhead. At a 250 kilobit per second transmission rate, transmitting a packet of ten bytes over the air may take only 320 microseconds. Including the software overhead, the total time required for transmission and reception of the data packet may be 700 microseconds. Thus, over one-half of the total time required for transmission and reception of the data packet may be occupied by the software overhead.

Figure 3:
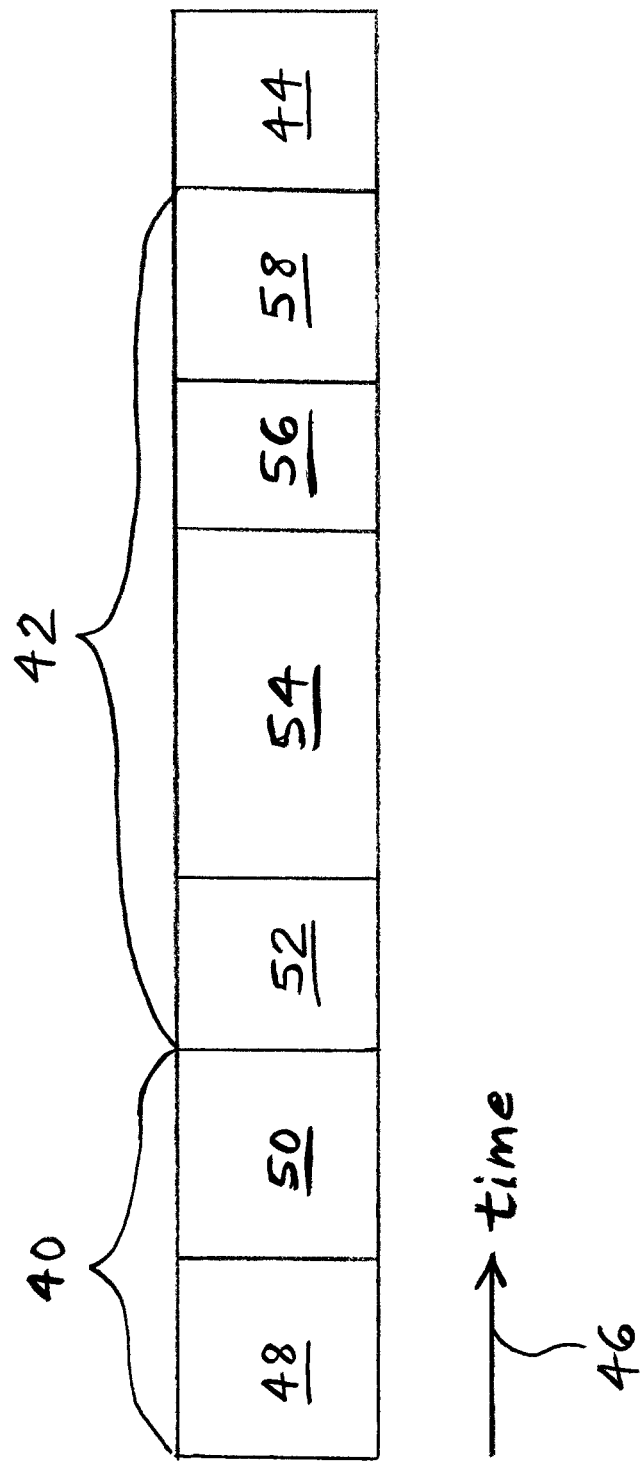
FIG. 3 is a more detailed diagram of the data format of FIG. 2.

FIG. 3 presents a more detailed breakdown of a data packet over time, as indicated by arrow 46, although the time durations of the various portions of the data packet are not necessarily drawn to scale in FIG. 3. First portion 40 of the data packet may include software overhead 48 for the processor of the sensor, and radio overhead 50 for self-calibration of the radio transmitter. Second portion 42 of the data packet may include a preamble 52, a header 54 specifying a node identification and a length of the sensor data, sensor data 56 itself, and a trailer 58 providing a cyclic redundancy check (CNC). Third portion 44 may include software overhead for the processor of receiver PLC 36.

As is evident from FIGS. 2 and 3, most of the transmission latency from a sensor is due to either software or header overheads. This is because for most sensors the actual sensory data is usually about one or two bytes of information.

Figure 4:
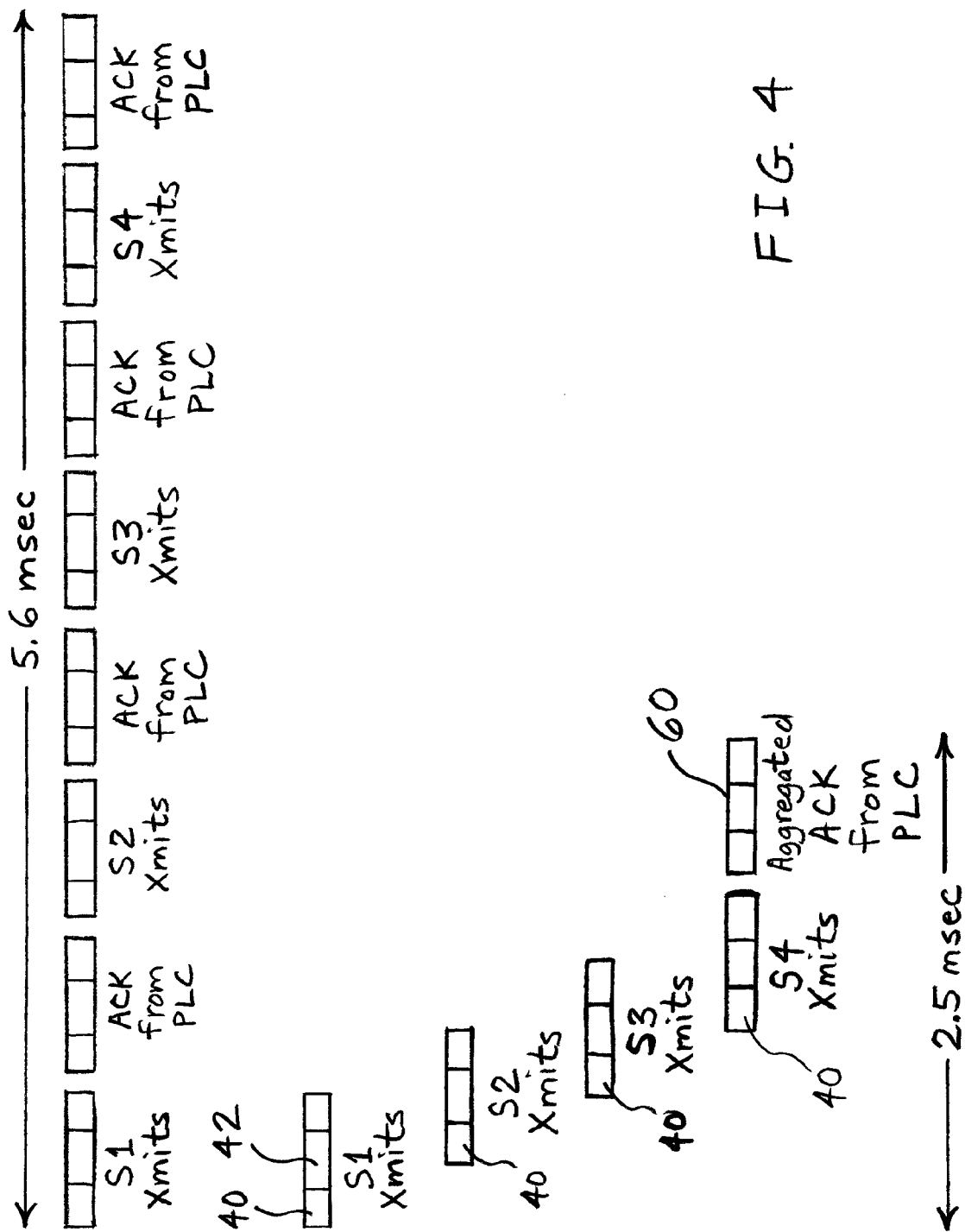
FIG. 4 is a diagram comparing a serial data packet transmission method to a pipelined method of the present invention for transmitting data packets.

A transmission pipelining technique illustrated in FIG. 4 and employed in one embodiment of the present invention provides an increase in throughput when more than one sensor has data that is available to be transmitted at the same time. Consider four sensors S1, S2, S3, S4 intending to transmit data to PLC 36. In order to enhance reliable transmission by the sensors, PLC 36 may respond by sending an acknowledgement back to the sensor. Upon not receiving an acknowledgement, the sensor may re-transmit the entire packet. At the top of FIG. 4 is illustrated a serial data packet transmission scheme in which a first sensor S1 transmits a data packet, PLC 36 transmits an acknowledgement code to sensor S1, a second sensor S2 transmits a data packet, PLC 36 transmits an acknowledgement code to sensor S2, and so on. Assuming that each of the four data packets includes ten bytes and has a duration of about 700 microseconds, and each of the four acknowledgement codes also has a duration of about 700 microseconds, the total time required to transmit, receive and acknowledge the four ten-byte data packets is about 5.6 milliseconds.

In the lower portion of FIG. 4 there is illustrated a transmission pipelining method in which all of the four sensors may send their packets in an overlapping fashion, and then PLC 36 may respond to all of them in an aggregated acknowledgement. Particularly, a data portion 42 of a data packet transmitted by sensor S1 does not get fully transmitted before transmitter software overhead 40 of a subsequent data packet is commenced by sensor S2. Similarly, a data portion 42 of a data packet transmitted by sensor S2 does not get fully transmitted before transmitter software overhead 40 of a subsequent data packet is begun by sensor S3, and so on. However, the data portion 42 of a data packet transmitted by sensor S2 does not begin being transmitted until the transmission of the data portion 42 of a data packet transmitted by sensor S1 is completed. Similarly, the transmission of a data portion 42 of a data packet of sensor S2 ends before the transmission of the data portion 42 of a data packet transmitted by sensor S3 begins, and so on. Thus, the transmissions of the data portions 42 of the data packets for the various sensors do not overlap in time. At the completion of the last data packet, which is from sensor S4 in the example illustrated in FIG. 4, an aggregated acknowledgement code 60 is transmitted from PLC 36. Acknowledgement code 60 may include an acknowledgement of the receipt of each of the data packets from each of the sensors. The size of the aggregated acknowledgement packet may be longer than the size of the sensor packets as it may contain information for all the sensors. As indicated in FIG. 4, the total time required to transmit, receive and acknowledge the four data packets using the transmission pipelining method is about 2.5 milliseconds, which is less than half the non-pipelined version.

Transmission pipelining takes advantage of the fact that, for small sized packets, only a small fraction of the transmission time occurs when bits are in the air, that is, during over-the-air transmission time for data portion 42, including preamble 52, header 54, data 56 and trailer bits 58. Transmission pipelining may essentially overlap the data packet transmissions from various sensors in a manner depicted in FIG. 4 so that the actual over-the-air transmissions, i.e., transmissions of data portions 42, never overlap.

Figure 5:
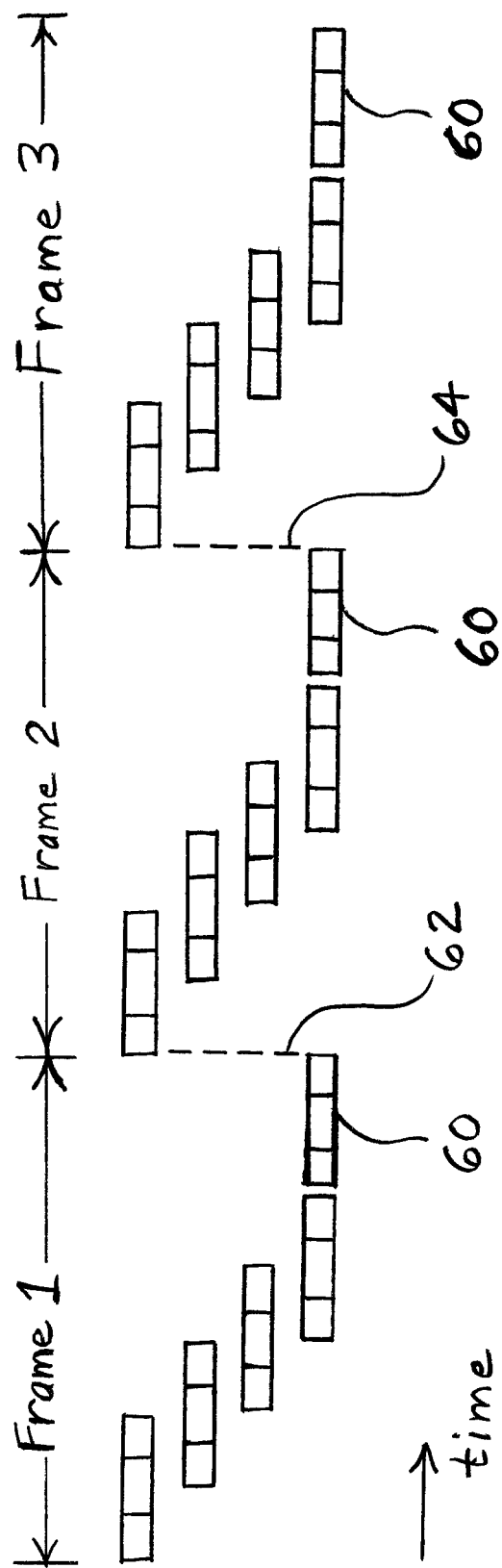
FIG. 5 is a diagram illustrating the pipelined method of FIG. 4 over a longer time period.

The transmission pipelining scheme shown in FIG. 4 may be repeated many times over with each new set of data packets from the sensors, as illustrated in FIG. 5. At the completion of the transmission of each aggregated acknowledgement code 60, transmission of a next set of data packets may commence, as indicated at 62 and 64 in FIG. 5. It is to be understood that, although only three transmission cycles or "frames" are shown in FIG. 5, the transmission frames may be repeated indefinitely.

Consider an assembly line including 100 sensors but only a maximum of ten sensors may report data at the same time. One way to accommodate the 100 sensors is to provide them unique time division multiple access (TDMA) slots. However, the latency in such a system does not scale with the number sensors. For example, 100 sensors would require about 100 milliseconds if each packet required one millisecond of transmission time. Because a maximum of only ten sensors simultaneously communicate at any given time, it is wasteful to provide every sensor with a unique transmission time slot. Herein is described a medium access code (MAC) protocol whose performance depends not on the number of sensors but rather only on the maximum burst size, wherein "burst size" is defined as the number of sensors intending to transmit simultaneously.

Figure 6:
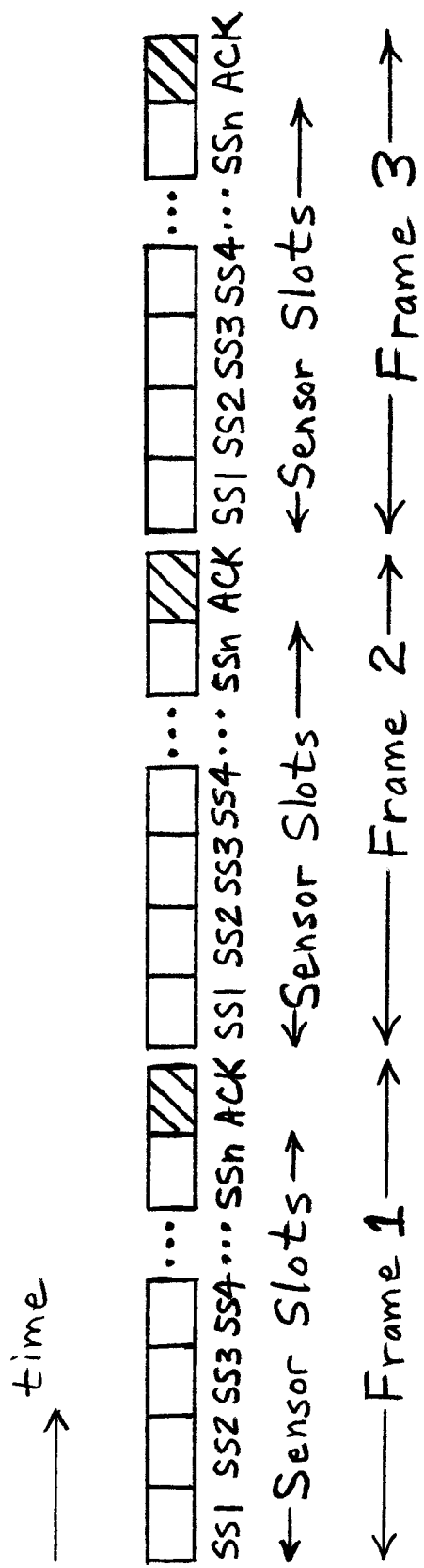
FIG. 6 is another diagram illustrating the pipelined method of FIG. 4.

One embodiment of the method of the present invention may use the pipelined communication pattern as depicted in FIGS. 5 and 6. The transmission pattern includes two types of time slots, namely, sensor data time slots (SS1, SS1, ..., SSn) and the ACK time slots as depicted in FIG. 6. Every sensor that intends to transmit a data packet may independently and/or randomly select a sensor data time slot among the available 'n' sensor data time slots, and may then transmit the packet in the selected sensor data time slot. It is possible for two or more sensors to coincidentally select a same sensor time slot, which may result in a packet collision. In a packet collision, data from the two or more sensors becomes intermixed, and thus PLC 36 is unable to accurately receive data from any of the sensors whose packets collide. In the ACK time slot at the end of each frame, PLC 36 may transmit a radio frequency acknowledgement or notification to each of the sensors or nodes from which PLC 36 successfully received data. If a sensor does not receive an acknowledgement that the data it transmitted was successfully received by PLC 36, the sensor may repeat the time slot selection and transmission procedure in the next frame.

Figure 7:
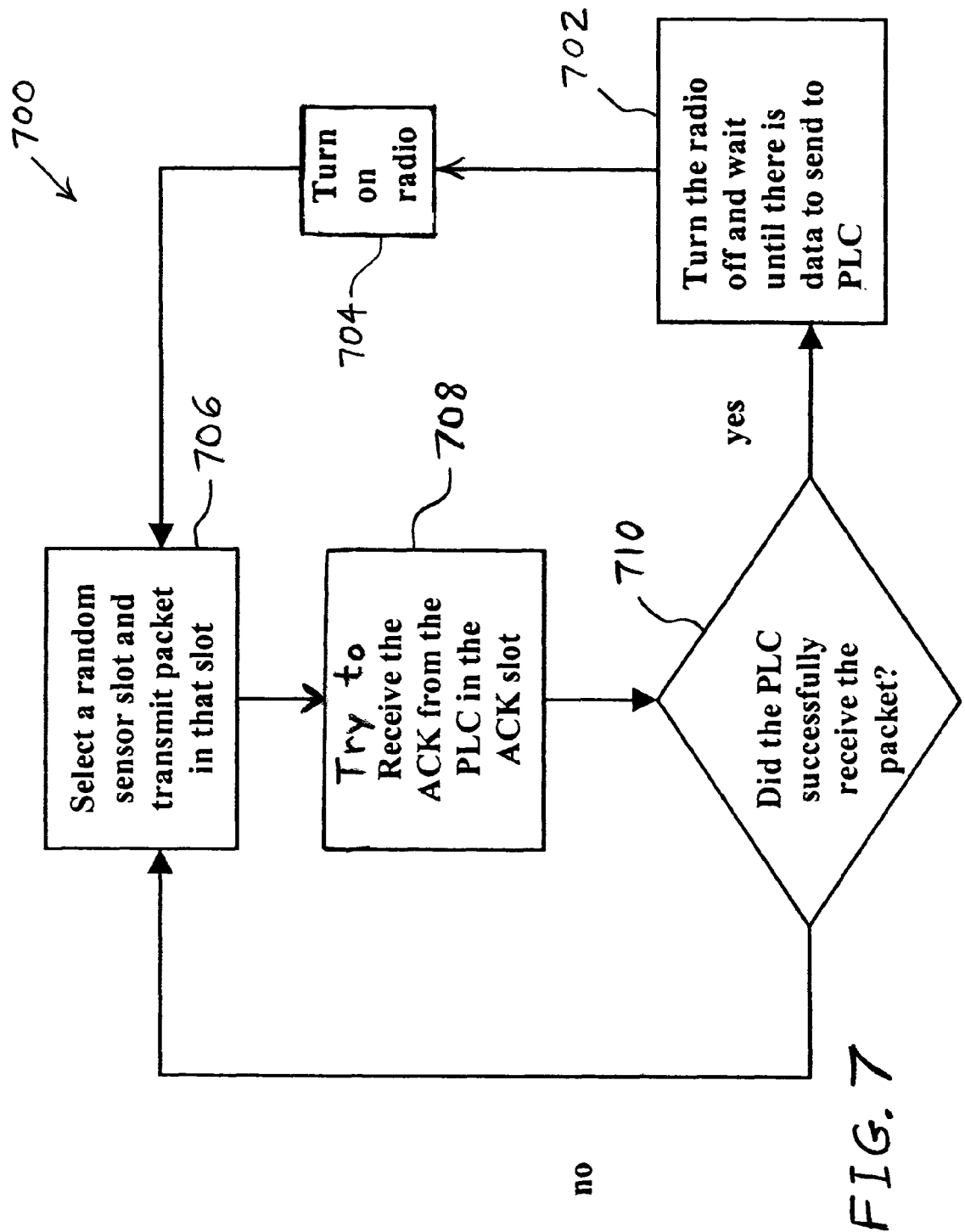
FIG. 7 is a flow chart of one particular embodiment of a wireless data transmission method of the present invention.

One embodiment of a wireless data transmission method 700 of the present invention is illustrated in FIG. 7. In a first step 702, the transceiver or "radio" of a sensor is in an "OFF" state in which the sensor may be neither transmitting radio frequency signals nor monitoring the air waves for transmission of radio frequency signals to the sensor. In this OFF state, the sensor may be drawing a reduced level of power and/or current. When the sensor detects the presence of a work piece, such as at a certain point along assembly line 22, the sensor may make a reading and produce associated data that is to be sent to a central controller, such as PLC 36. Next, in step 704, the radio is turned "ON", e.g., is fully powered up, in preparation for transmitting the data to PLC 36.

In the next step 706, a sensor data time slot is randomly selected by the sensor, and the sensor transmits a data packet during that selected time slot. For example, a processor within the sensor may include a random number generating means. With reference to the embodiment of FIG. 6, the sensor processor may use the randomly generated number to randomly select one of sensor data time slots SS1, SS2, ..., SSn. In one embodiment, the sensor processor may use a formula that provides a correspondence between the randomly generated numbers and the sensor data time slots. It is possible that one or more other sensors randomly and independently selected the same sensor time slot. If so, the PLC may receive a mixture of the data from multiple sensors, and the PLC may not be able to interpret such a mixture of data.

In step 708, the sensor attempts to receive the acknowledgement code from PLC 36 in the acknowledgement time slot. For instance, the sensor may monitor the air waves for a signal of a specific frequency at which PLC 36 is known to transmit acknowledgement codes. In a final step 710, it is determined whether the PLC successfully received the data packet that was transmitted in step 706. Particularly, if the sensor did receive the acknowledgement code in step 708, then it is determined that the PLC successfully received the data packet. Operation then continues to step 702, wherein the sensor radio is turned OFF and the sensor waits until there is data to send to the PLC. If the sensor did not receive the acknowledgement code in step 708, then it is determined that the PLC did not successfully receive the data packet. Operation then continues to step 706, wherein the sensor may again independently select a random sensor time slot and may retransmit the same data packet that was not successfully received by the PLC immediately before.

Performance of the protocol may depend on the size of the burst, i.e., the number of sensors intending to transmit data simultaneously. The number of sensor data time slots to be provided in a frame can be determined based on the requirements of the application, such as maximum burst size, packet loss rates of the wireless channel, reliability-latency constraints etc., through an optimization scheme. As an example of a reliability-latency constraint, all packets in a burst of ten sensors may be required to reach the PLC within 10 milliseconds with a probability of 99.99%.

Figure 8:
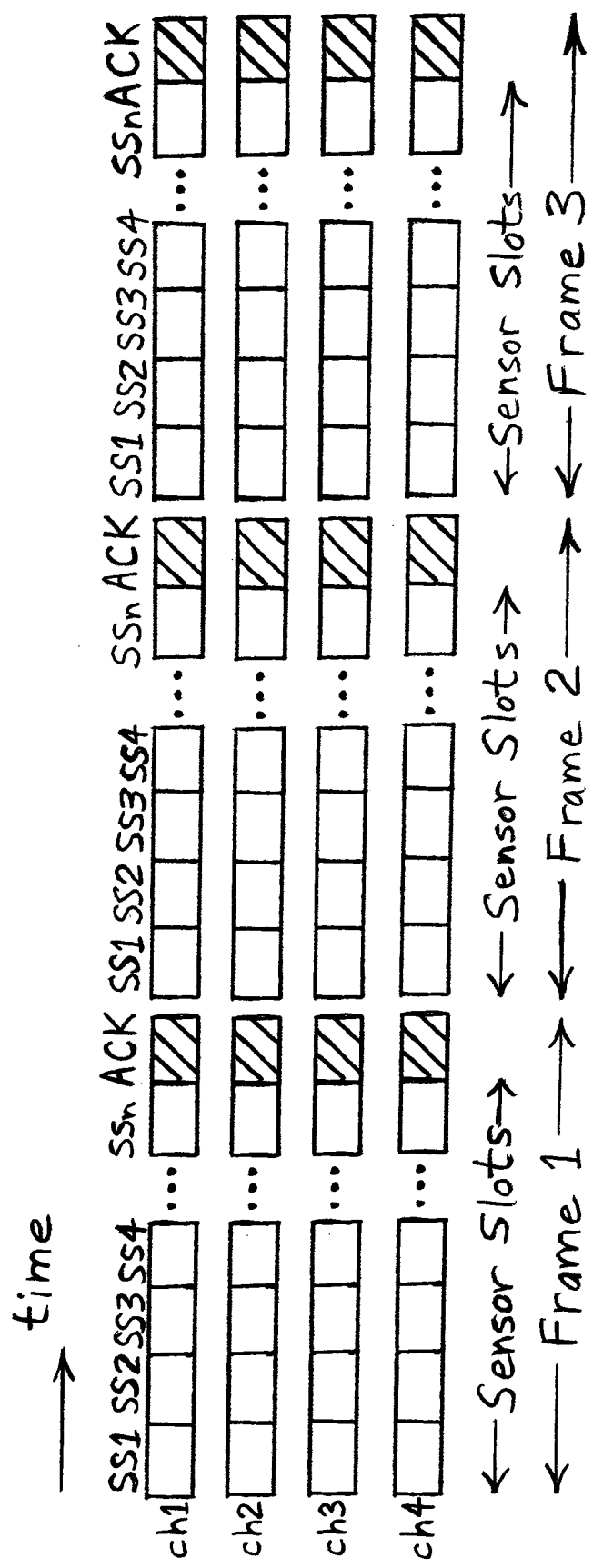
FIG. 8 is a diagram, similar to FIG. 6, illustrating a pipelined method of wireless data transmission according to another embodiment of the present invention.

To increase the number of slots available at the same time, the PLC may be equipped with multiple receivers, with each receiver monitoring or listening for sensor data packets on a different respective frequency channel. This scheme is depicted in FIG. 8. Different channels, such as ch1, ch2, ch3 and ch4, may be assigned based on different frequencies or orthogonal codes or any other mechanism.

In the embodiment of FIG. 8, a sensor may randomly and/or independently select both the time slot and the channel/receiver and transmit data in that chosen time slot to the chosen receiver. The corresponding chosen receiver may send a radio response to the transmitting sensor in the ACK time slot, notifying the sensor that the receiver received the packet successfully. In other embodiments, larger numbers of channels can be employed to not only accommodate larger sized bursts but also to further reduce latency.

Figure 9:
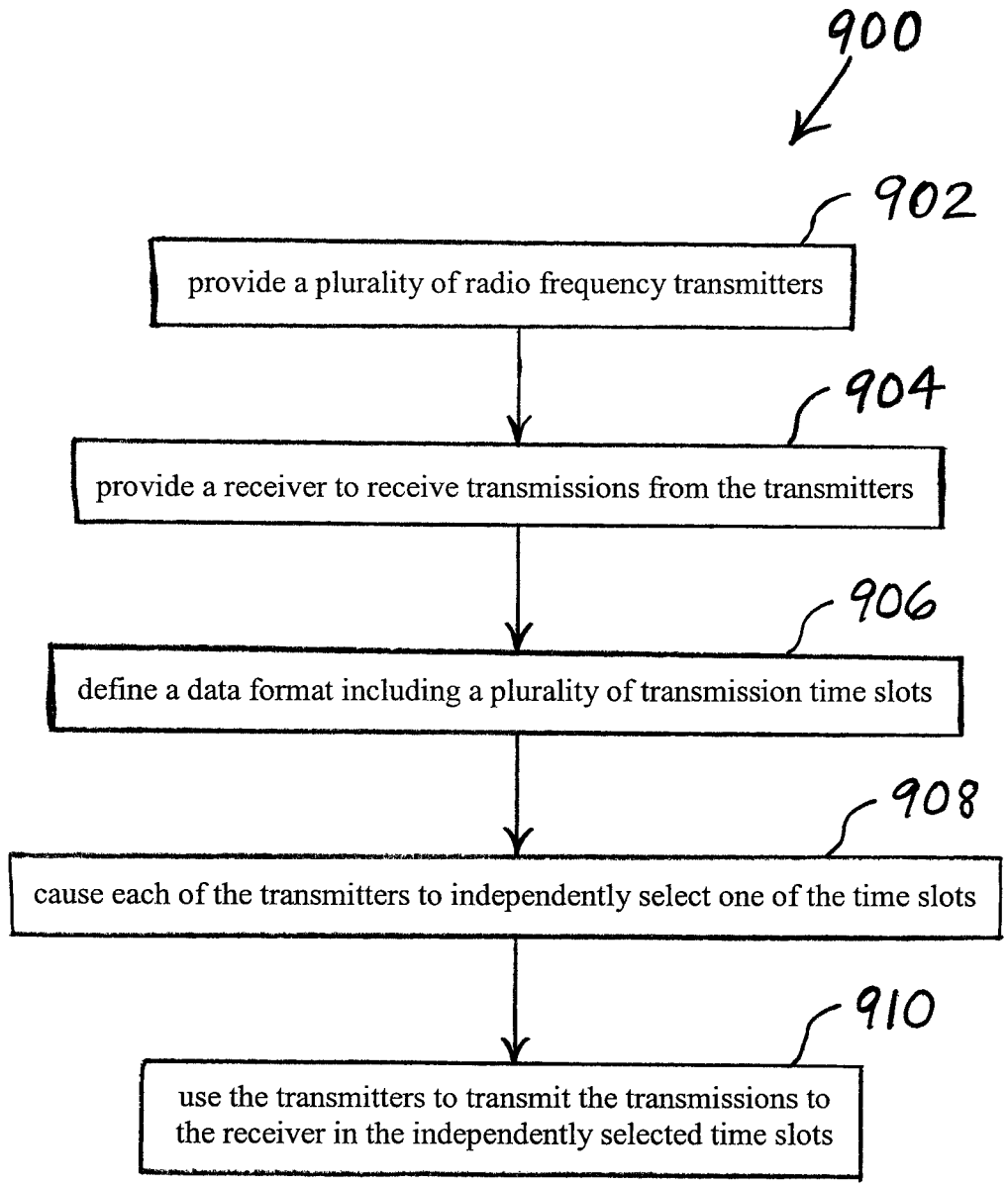
FIG. 9 is a flow chart of another embodiment of a wireless data transmission method of the present invention.

FIG. 9 illustrates one embodiment of a wireless data transmission method 900 of the present invention. In a first step 902, a plurality of radio frequency transmitters are provided. In the specific embodiment illustrated in FIG. 1, for example, a plurality of sensors 30, 32 are provided, wherein each of the sensors includes a radio frequency transmitter. In a next step 904, a receiver is provided to receive transmissions from the transmitters. For example, in the embodiment illustrated in FIG. 1, PLC 36 includes a receiver for receiving sensor data transmissions from the transmitters of the sensors. In step 906, a data format is defined including a plurality of transmission time slots. In the embodiment illustrated in FIG. 6, for example, a data format is defined including a plurality of transmission time slots SS1, SS2, SS3, SS4, ..., SSn in which data may be transmitted from the sensors. In a particular embodiment, each of the time slots SS1, SS2, SS3, SS4, ..., SSn may be of a sufficient time duration such that a sensor may transmit all of the data that the sensor has available to transmit within the time constraints of a single time slot. In a next step 908, each of the transmitters is caused to independently select one of the time slots. For instance, each of the sensors may include a processor that makes a selection of one of time slots SS1, SS2, SS3, SS4, ..., SSn without any input or influence from any other sensor or from a time slot selection made by another sensor. In a final step 910, the transmitters are used to transmit the transmissions to the receiver in the independently selected time slots. For example, the transmitters in the sensors may be used to transmit sensor data transmissions to the receiver of PLC 36 in the sensor data time slots that the sensors independently selected.

Figure 10:
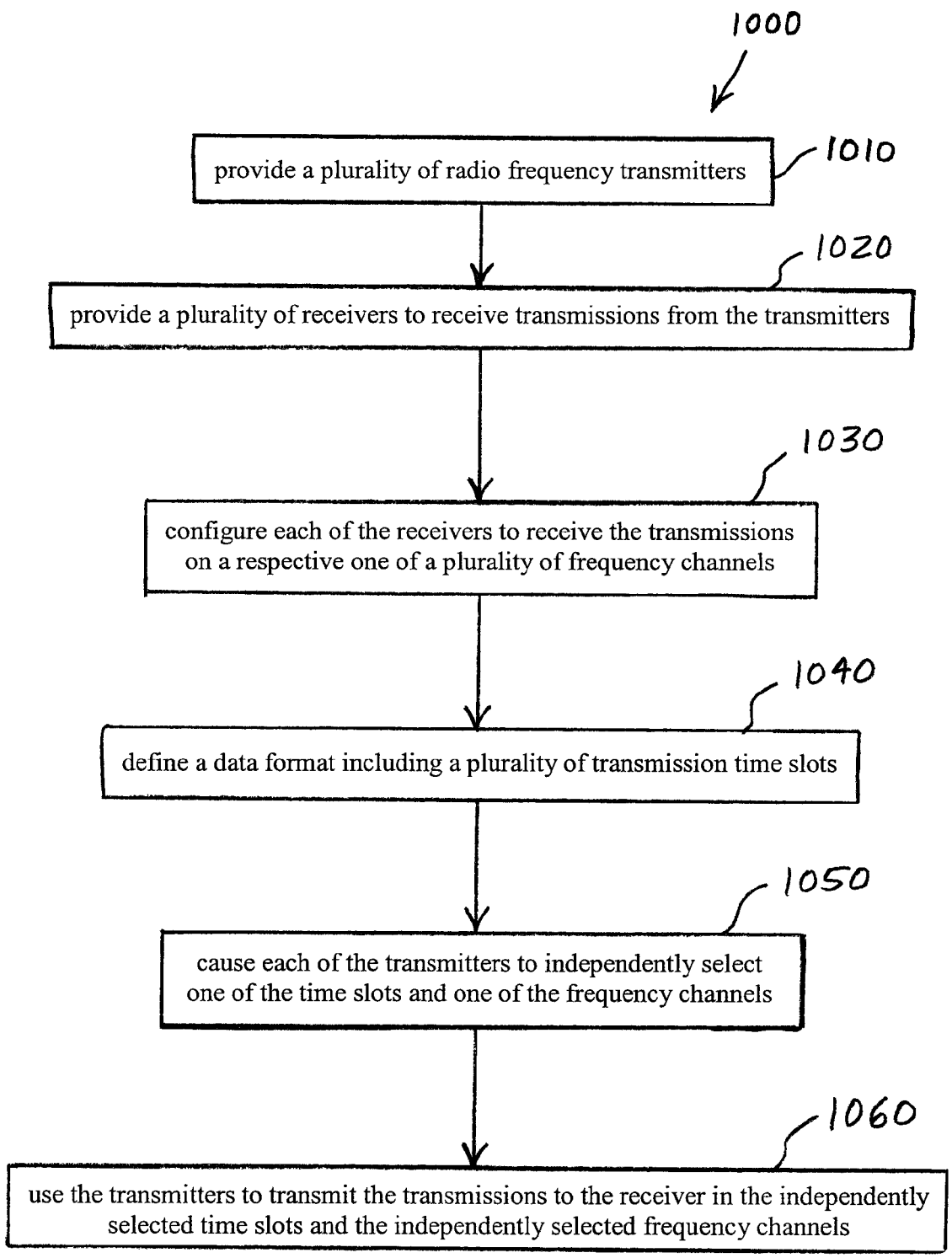
FIG. 10 is a flow chart of yet another embodiment of a wireless data transmission method of the present invention.

FIG. 10 illustrates another embodiment of a wireless data transmission method 1000 of the present invention. In a first step 1010, a plurality of radio frequency transmitters are provided. In the specific embodiment illustrated in FIG. 1, for example, a plurality of sensors 30, 32 are provided, wherein each of the sensors includes a radio frequency transmitter. In a next step 1020, a plurality of receivers are provided to receive transmissions from the transmitters. For example, in the embodiment illustrated in FIG. 8, PLC 36 includes multiple receivers for receiving sensor data transmissions from the transmitters of the sensors in multiple respective channels, such as channels ch1, ch2, ch3, ch4. In step 1030, each of the receivers is configured to receive the transmissions on a respective one of a plurality of frequency channels. In the embodiment of FIG. 8, each of the receivers of PLC 36 may receive transmissions from sensors 30, 32 on a respective one of frequency channels ch1, ch2, ch3, ch4. Next, in step 1040, a data format is defined including a plurality of transmission time slots. For example, in the embodiment of FIG. 8, a data format is defined including a plurality of transmission time slots SS1, SS2, SS3, SS4, . . . , SSn in which data may be transmitted from the sensors. In a particular embodiment, each of the time slots SS1, SS2, SS3, SS4, . . . , SSn may be of a sufficient time duration such that a sensor may transmit all of the data that the sensor has available to transmit within the time constraints of a single time slot. In a next step 1050, each of the transmitters is caused to independently select one of the time slots and one of the frequency channels. For instance, each of the sensors may include a processor that makes a selection of one of time slots SS1, SS2, SS3, SS4, . . . , SSn and one of frequency channels ch1, ch2, ch3, ch4 without any input or influence from any other sensor or from a time slot selection or channel selection made by another sensor. In a final step 1060, the transmitters are used to transmit the transmissions to the receiver in the independently selected time slots and the independently selected frequency channels. For example, the transmitters in the sensors may be used to transmit sensor data transmissions to the receiver of PLC 36 in the sensor data time slots and the frequency channels that the sensors independently selected.

Figure 11:
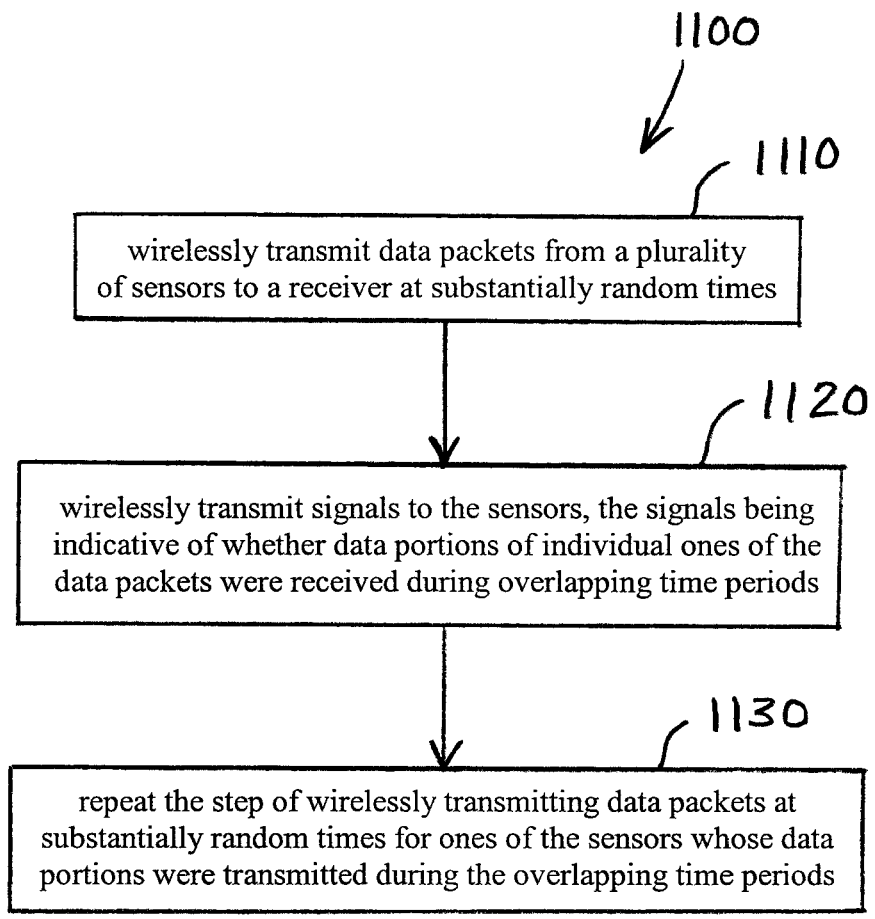
FIG. 11 is a flow chart of a further embodiment of a wireless data transmission method of the present invention.

FIG. 11 illustrates an embodiment of a data transmission method 1100 of the present invention. In a first step 1110, data packets are wirelessly transmitted from a plurality of sensors to a receiver at substantially random times. For example, in the embodiment of FIG. 1, wireless sensors 30, 32 may transmit radio frequency signals including data packets to a receiver in PLC 36 at substantially random times. In a particular embodiment, each of the sensors may include a processor that has random number generating capability. The random numbers that are generated may be used in an algorithm to identify random times at which to wirelessly transmit the data packets to the receiver in PLC 36. Other algorithms may be employed for generating numbers that may not be strictly "random" in the rigorous mathematical sense, but that are substantially random such that that the selected times may be substantially evenly distributed over a certain time period. In a next step 1120, signals are wirelessly transmitted to the sensors, wherein the signals are indicative of whether data portions of individual ones of the data packets were received during overlapping time periods. In the embodiment of FIG. 6, PLC 36 may wirelessly transmit acknowledgement signals to ones of sensors 30, 32 from which data packets were successfully received. The success or accuracy of the receipt of a data packet may be determined by any of various conventional methods, such as bit checking. If two or more sensors 30, 32 transmit data portions 42 in overlapping or conflicting time periods, it may be very likely that none of the data packets from the conflicting sensors are successfully received. Conversely, if a sensor 30, 32 transmits a data portion 42 in a time period that does not overlap a time period in which any other one of sensors 30, 32 transmits, then it may be very likely that the data packet is successfully received. Thus, an acknowledgement signal transmitted to a particular sensor may be indicative that a data packet from the sensor was received in a non-overlapping time period. Conversely, if an acknowledgement signal is not transmitted to a particular sensor, it may be indicative that a data packet from the sensor was received in a time period that overlaps a time period in which another conflicting sensor transmitted a data packet. In a final step 1130, the step of wirelessly transmitting data packets at substantially random times is repeated for ones of the sensors whose data portions were transmitted during the overlapping time periods. In a particular example, each of sensors 30, 32 that did not receive an acknowledgement signal, which is indicative of their data packets being transmitted during overlapping time periods, may re-transmit the same data packets at substantially random and re-selected times.

In another embodiment, a low latency MAC is built, and the invention reduces the latency of transmission of a single packet. The latency involved in the transmission of a single packet may be both quantified and minimized.

The contents of a sensor packet may be reduced, because the smaller the packet, the smaller the length of time that may be required to transmit. Further, a smaller packet also has a greater chance of succeeding in the channel. For example, at a channel bit error rate (BER) of one in a thousand, the packet success rate (PSR) for an eleven byte packet is 91.5% (($1-\text{BER})^{8 \times 11}$), whereas that for a twenty byte packet is only 85.2%. Thus, it may be desirable to minimize the size of the sensor packet.

The transmission process may start with the radio transmitting over the air a four-byte preamble that is used by the receiver for synchronization. The preamble may be followed by a two-byte Start of Frame Delimiter (SFD) field, which may be required to ensure that the receiver is indeed receiving a valid packet. A CC2420 radio may also require a length field so that the radio hardware can know how many bytes to receive.

A network identifier may be provided so that packet transmissions from neighboring machines can be rejected. One way to avoid the use of a network identifier is to use the SFD bytes as the network identifier. This may help in not only reducing the packet size, but may also speed up the network stack since packets may be rejected based on the SFD in the radio hardware itself. A CC2420 radio may allow the programmer to configure the SFD. The destination and source identifiers are usually the next fields used in typical packets. While the source identifier may be needed to identify which sensor transmitted the packet, the destination for a sensor packet is always the controller and thus a destination identifier may not be needed.

Figure 12:
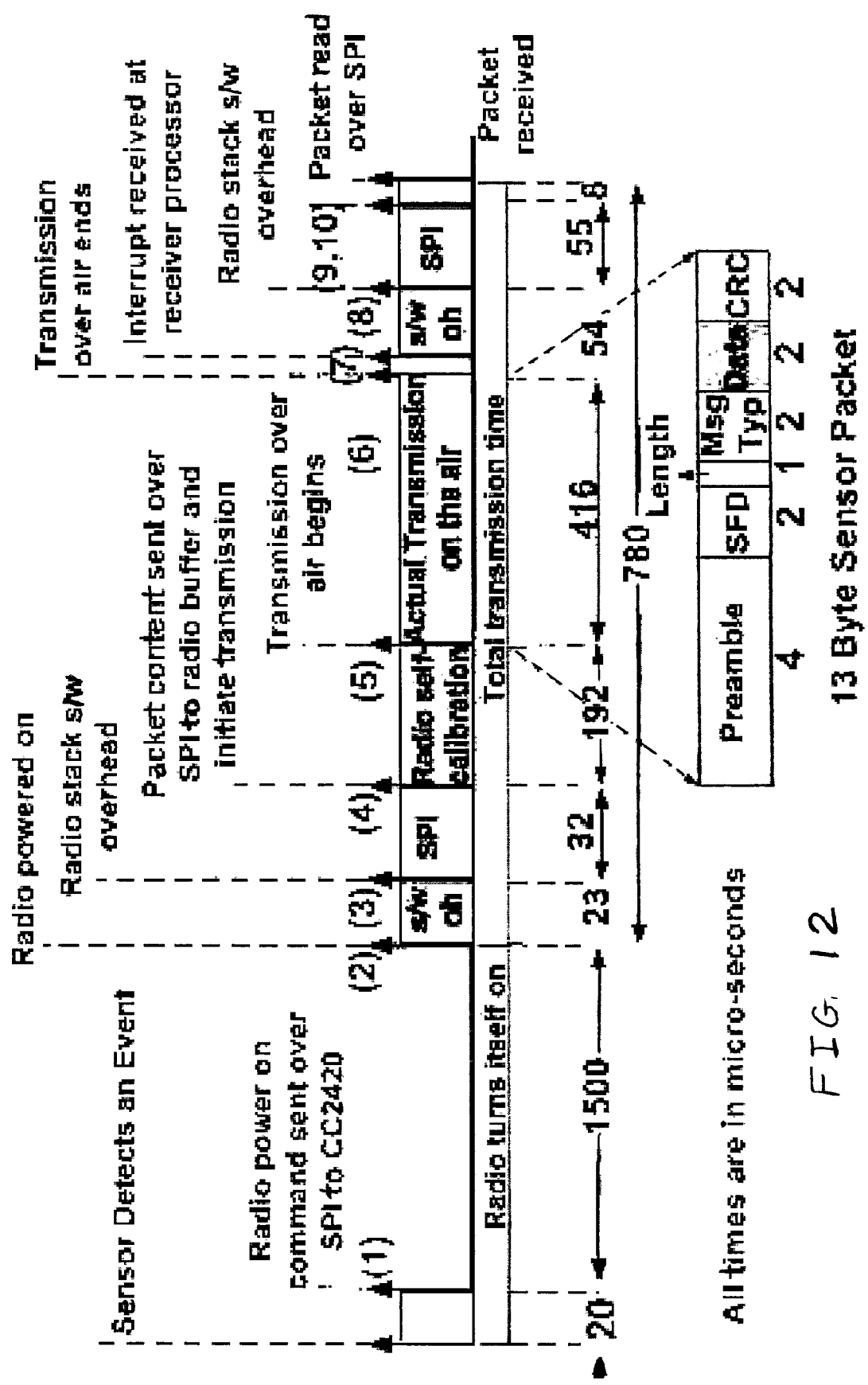
FIG. 12 is a timeline of events that may occur between a sensory event at the wireless sensor until the packet reception at the controller over a CC2420 radio.

A two-byte data field may be sufficient for most sensors used in discrete event control systems. Finally, a two-byte cyclic redundancy check (CRC) is computed by the CC2420 radio hardware to ensure the integrity of the content of the packet. Thus, a thirteen-byte sensor packet may be provided (FIG. 12). In general, however, a packet may need to be at least nine bytes long in order to include a preamble, SFD, length and CRC. All other fields may be considered herein as payload.

In general, the radio software stack may be implemented in several different ways depending on the generality and flexibility desired. The more layers and function calls in the software, the greater the execution time. In practice, every few lines of code removed can result in a reduction of several tens of microseconds of latency of packet transmission. Implementation of the radio stack on a MSP430 microcontroller may be optimized to a bare minimum for use in the present invention in order to minimize latency at the cost of a possible loss of generality.

The communication between the CC2420 radio and the MSP430 microcontroller may be via a serial peripheral interface (SPI). The CC2420 radio may act as a slave and expect commands to be sent from the MSP430 microcontroller over the SPI interface for operations such as turning the radio on, switching the channel, initiation of transmission, reading the CC2420 radio buffer, etc. By performing several measurements on the stack and using the MSP430's 5 Mhz clock for the SPI, it has been found that the latency involved in writing/ reading n bytes over the SPI to the radio is roughly given by (17+3n)μsec. Sending a command such as "power on" over the SPI thus takes about 20 μsec. Setting a register on the CC2420 radio for configuration, such as changing power level, requires about 23 μsec since two bytes are transmitted, i.e., the address of the register and the value. For a thirteen-byte packet, while transmitting, five bytes are written over the SPI—one length and four data bytes of payload (CRC, SFD and preamble are all generated by CC2420 radio hardware). Thus, transmission takes 32 μsec. While reading, first the length field may be read to determine the size of the packet (this takes 20 μsec), and then the rest of the packet, six bytes (four data bytes and a two-byte CRC), is read. This requires 35 μsec. The total time is thus, 55 μsec to read a thirteen-byte packet.

FIG. 12 depicts the sequence of various significant events that occur during the transmission and reception of a 13-byte packet with approximate processing times. The sequence of events below lists in detail the delays seen on the sensor node at every stage of packet transmission for a data payload of d (total d+9 bytes). In a first stage, the microcontroller sends a command over the SPI interface to turn on the radio (20 μsec). In a second stage, the radio wakes up with a variable delay of up to 1.5 msec. In a third stage, a packet is created and the necessary software state in the communication stack is updated (23 μsec). In a fourth stage, a packet is sent to the radio transmit buffer over SPI 17+3(d+1)μsec. In a fifth stage, the CC2420 radio calibrates itself for transmission (192 μsec). In a sixth stage, the radio transmits the packet over the air [32(d+9)μsec]. In a seventh stage, the receiver gets a packet interrupt and is notified of the presence of a packet in the receive buffer (8 μsec). An eighth stage includes communication stack overhead at the receiver (54 μsec). In a ninth stage, the receiver reads the length byte of the received packet over SPI (20 μsec). In a tenth stage, the receiver reads the packet contents over SPI [17+3(d+2)μsec] (two bytes extra for reading CRC). In an eleventh stage, the receiver updates software states in the communication stack and hands over the packet to application (8 μsec). In general, the application-to-application transmission time excluding variable wakeup delay can be calculated in μsec as $$\tau_s = 628 + 38d. \quad \text{equation (1)}$$

Additional operations such as setting transmission power level or setting transmission may each incur an additional 23 μsec.

The novel technique transmission pipelining can be used while designing MAC protocols to enhance the channel throughput in the event of a traffic burst. The essence of transmission pipelining may be described with reference to FIG. 13. Four nodes have data for transmitting thirteen-byte packets at the same time. Take the example of an arbitrary slotted-MAC protocol, where time is divided into slots (e.g., slotted ALOHA, TDMA, etc.) and each node is allowed to transmit only at the beginning of a slot. If each of the sensor nodes were scheduled to transmit exactly one after the other, each slot would be 780 μsec long and they would require 3.1 msec to transmit the data.

Figure 13:
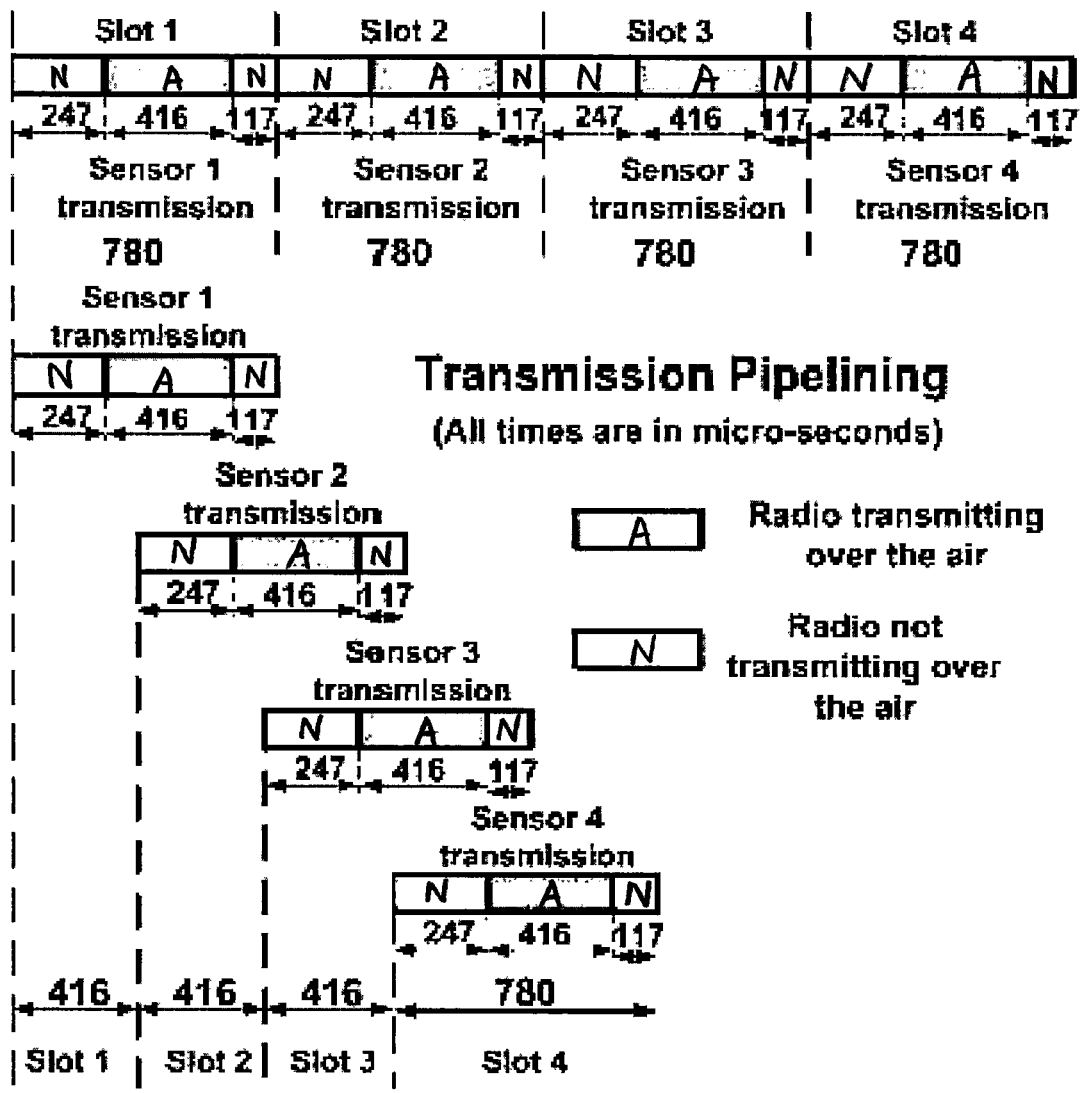
FIG. 13 is an exemplary timeline illustrating transmission pipelining.

An examination of FIG. 12, however, reveals that while transmitting the thirteen-byte packet takes 780 μsec, the time when bits are actually being transmitted over the channel is only 416 μsec. In other words, almost 50% of the total application-to-application transmission time is essentially processing overheads at the sensor nodes. Transmission pipelining is based on the idea that another node could potentially use these idle processing times to transmit data. Thus, as shown in FIG. 13, the slot width can actually be reduced to 416 μsec. Node 2 initiates its transmission 416 μsec after node 1 instead of 780 μsec after. The reason transmission from node 2 may succeed is that by the time node 2 starts actual transmission over the air, node 1 will have finished transmitting over the air.

In transmission pipelining, transmissions from various sensor nodes are overlapped in a manner so as to ensure that their periods of transmission over the air are placed immediately one after the other. Thus, while one sensor node is transmitting bits over the air, another node is processing for getting ready to transmit over the air, i.e., "pipelining." Transmission pipelining can significantly improve channel utilization in the wake of a sensor traffic burst. This technique is not specific to CC2420 radios, but rather can be used in almost any radio that has significant software/hardware overheads in the packet transmission process.

In a practical implementation, however, two factors may prevent achieving 100% channel utilization. The first factor is time synchronization errors among nodes. The second factor is the receiver's inability to receive packets immediately one after the other.

In any slotted scheme, nodes may be time-synchronized to have a common notion of time and the slot boundaries. A practical scheme may account for time-synchronization errors and provide guard time around each slot. In one embodiment, the 32 KHz real time clock in the MSP430 microcontroller may be used for timekeeping, and it may be ensured that time-synchronization error between any two sensor nodes is less than two ticks, i.e., 64 μsec. This may widen each slot by 64 μsec.

As shown in FIG. 13, the radio transmission of one node starts as soon as the radio transmission of another ends. Thus, the transceiver at the controller starts to receive a new packet as soon as it has finished receiving the previous packet. In practice, after receiving one packet, a CC2420 radio may be unable to receive another packet immediately (a CC2420 radio may not be able to detect the packet at all). In practice, it may take the radio about 96 μsec after it has finished receiving the previous packet before it can reliably receive another radio transmission. Thus, an extra 96 μsec may be allowed in addition to the time-synchronization error. Thus, a total guard time of 96+64=160 μsec may be added to every transmission pipelined slot and 64 μsec may be added to every non-transmission pipelined slot.

When guaranteed performance is desired and traffic bursts are possible, contention-free protocols (e.g., TDMA) may be chosen as a MAC protocol in order to preclude the possibility of collisions. The entire class of contention-free MAC protocols can be divided into two categories, reservation-based and round-robin.

In a reservation-based MAC protocol, nodes may transmit reservation request to obtain exclusive rights for transmitting data. In a round-robin mechanism, nodes take turns to transmit a predetermined sequence, e.g., TDMA. A reservation-based MAC protocol may be suitable when the amount of data to be transmitted is large enough to justify the overhead of the reservation request mechanism. In applications in which a sensor typically transmits two bytes of data, using an explicit transmission reservation request may be wasteful. Thus, round-robin MAC mechanism where sensors take turns to transmit may be more efficient. A strawman approach may be taken to designing the most efficient round-robin MAC protocol.

Figure 14A:
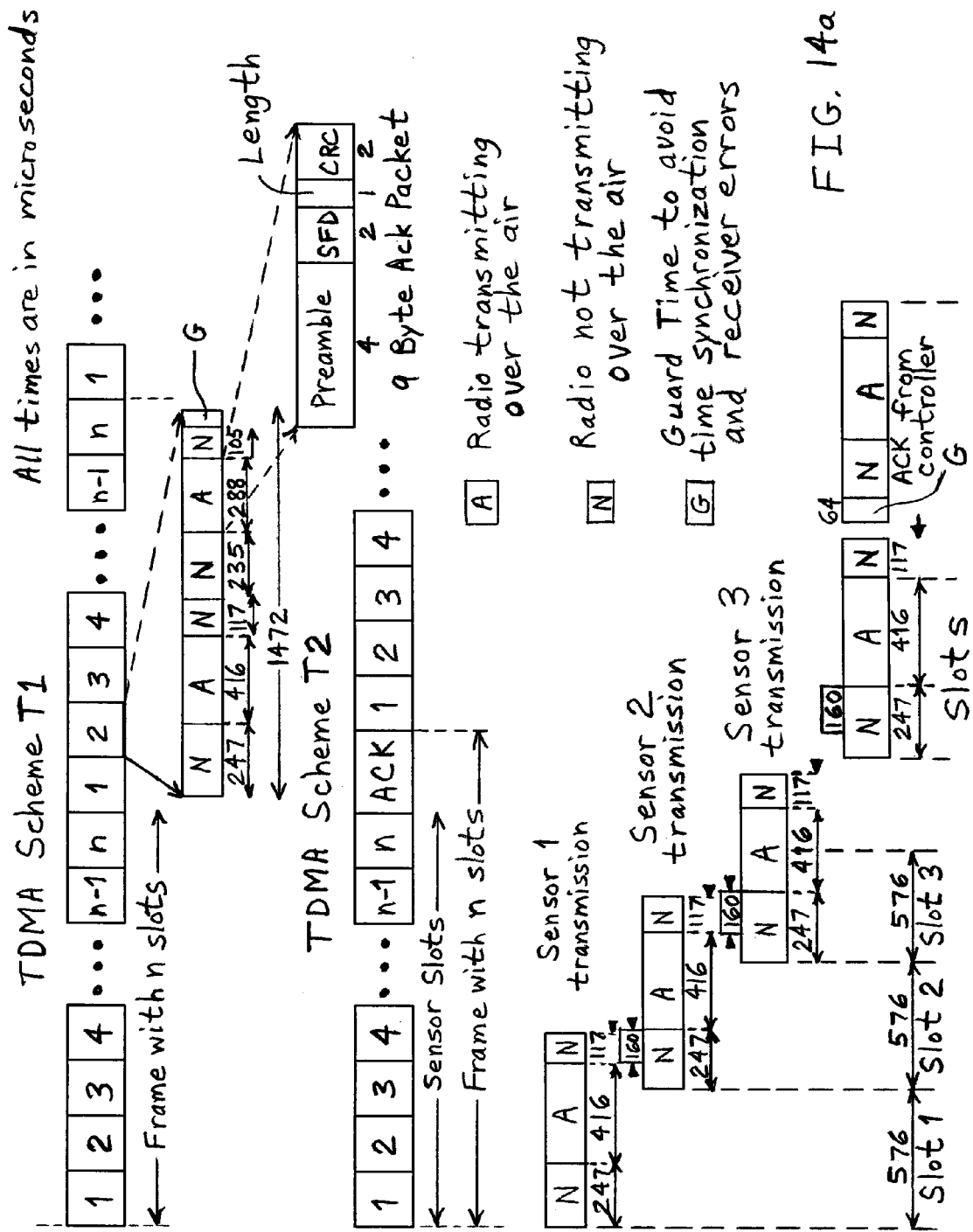
FIG. 14a is a timeline of various contention-free MACs, TDMA and Transmission pipelined TDMA.
Figure 14B:
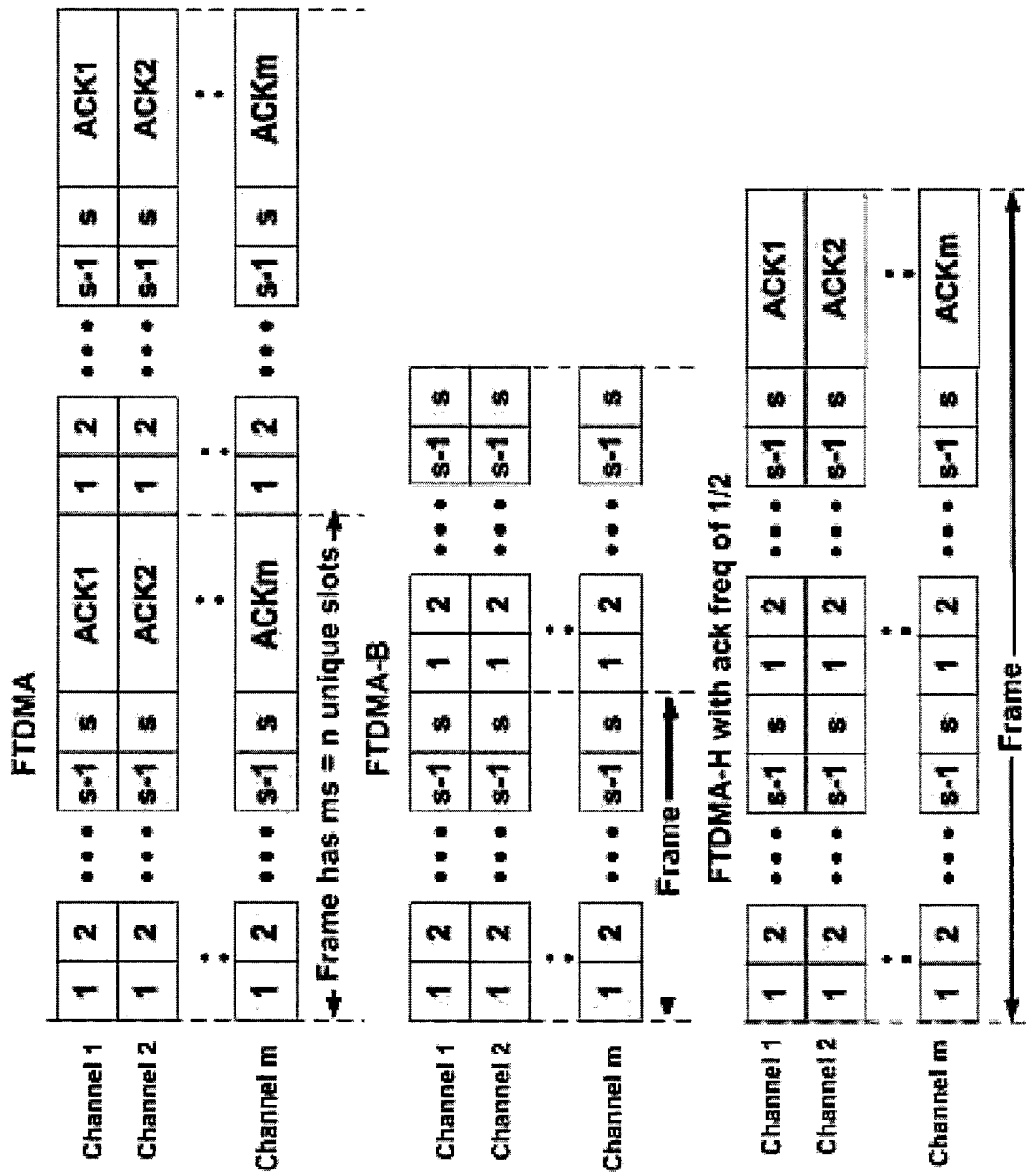
FIG. 14b is a timeline of various FTDMA, FTDMA-B and FTDMA-H.

The most basic round-robin mechanism may be the TDMA (T1) MAC. As shown in FIGS. 14a-b, time is divided into frames, each comprising n time slots where n is the number of sensors in the system. Each time slot may be intended for one transmission from a sensor and then transmission of an acknowledgement packet from the controller that notifies the sensor of the packet's receipt. Each of the n sensors is assigned a unique time slot in which the sensor is allowed to transmit. The acknowledgement packet from the controller requires neither the source nor the data fields since no other node in the system will transmit during this time. The acknowledgement packet, as shown in FIGS. 14a-b is thus only nine bytes long. As shown in FIGS. 14a-b, the duration of each time slot is about 1472 µsec including the 64 µsec intended to cope with time-synchronization errors. For a 200 sensor node system, the duration of each frame may thus be 280 msec. This means that a sensor may have to wait a worst case of 280 msec for transmitting only once. Thus, TDMA (T1) may not be suitable for applications that desire latencies in the range of five to fifty msec.

The performance of TDMA (T1) MAC is significantly improved by using the transmission pipelining technique of the present invention. FIGS. 14a-b illustrate a single frame of TDMA MAC-T2. Each frame of the T2 MAC includes n consecutive transmission pipelined time slots followed by a single acknowledgement packet from the controller that acknowledges all packets successfully received in the frame. The acknowledgement packet comprises an n-bit map in its payload. A "1" in the $k^{th}$ position indicates that a packet was successfully received in the $k^{th}$ time slot in the frame, while a "0" indicates that a packet was not successfully received in the $k^{th}$ slot. For example, in an eight sensor system, an acknowledgement of 11000101 means that the controller received a packet successfully in slots 1, 2, 6 and 8.

Each frame in T2 has n−1 transmission pipelined slots each 576 µsec long. The $n^{th}$ slot cannot be transmission pipelined since the acknowledgement packet can only be transmitted after the last packet has been received. Thus, the $n^{th}$ slot is 780+64 µsec long (64 µsec to account for time-synchronization errors). The acknowledgement packet does not require a source field (as in the case of MAC T1) and its data field is n/8 bytes long. The duration of the acknowledgement slot can be calculated using equation 1 as 628+38(n/8). The duration of a frame in T2 thus becomes 1472+(n−1)576+38(n/8)µsec. For a 200 sensor nodes this evaluates to about 118 µsec. While this is almost 40% of the frame duration of scheme T1, it is still much larger than the latencies that may be desired. This indicates that even the most efficient TDMA implementation is difficult to use over a CC2420 radio.

The primary bottleneck in both TDMA schemes T1 and T2 is the bandwidth at the controller. One way to relieve this bottleneck is to equip the controller with several transceivers so that multiple packets from various sensors can be received at the same time over different channels. For example, if the controller is equipped with m transceivers, m different sensors could potentially transmit packets to the controller at the same time over different channels. The design of the time division multiple access MAC may be extended to a frequency-time division multiple access (FTDMA) MAC where each sensor is assigned a unique time-frequency slot within a frame (see FIGS. 14a-b) to transmit. The number of time slots in the FTDMA frame is thus given by s=n/m.

At the end of the sensor transmissions, the controller transmits m acknowledgements simultaneously, one over each of its transceivers (see FIGS. 14a-b). Each acknowledgement consists of a s-bit map (similar to the n-bit map in MAC T2), where a "1" in the $k^{th}$ bit indicates that a packet was successfully received in the $k^{th}$ time slot over that channel and "0" otherwise. The number of data bytes in the acknowledgement packet is thus given by s/8 and its duration is given by 628+38 (s/8) µsec. The frame duration of the transmission pipelined FTDMA MAC can now be calculated as 1472+(s−1)576+38 (s/8) µsec. FIG. 15 depicts the frame durations for various number values of m and n. FIG. 15 provides a clear idea of how many transceivers may be needed to meet a five to fifty msec deadline for various numbers of sensor nodes in the system if the channel had no packet losses.

In real environments, however, packet losses are quite common. These may occur due to temporary fading in the channel (given that the system was initially configured such that all sensor-controller links had a "sufficient SNR margin") or due to collisions from transmissions from other co-existing systems. In the event of a packet loss, the sensor must retransmit the packet in its allocated slot in the next frame. In a real system thus, several frames may be required to successfully transmit a packet to the controller.

In the event of a sensor burst, transmissions from all the sensors must reach the controller within the deadline. The error probability is defined as the probability that at least one sensor fails in transmitting its packet successfully within the given deadline. Given that b sensors attempt to transmit at the same time and that the channel's instantaneous packet success rate is p (including the possibility of collisions and fading etc.), the probability that all b sensors will succeed within f frames is given by $1-(1-(1-p)^f)^b$. Thus, the minimum number of frames that need to be accommodated within the deadline to guarantee an error probability of $\epsilon$ is given by $$\log(1-e^{(1/b)\log(1-\epsilon)})/\log(1-p).$$

FIG. 16 provides the number of frames required to attain a one in a million error rate for various values of b and p. As seen from FIG. 16, while for good links only three frames are required to guarantee an error probability of one in a million, as the link degenerates, the number of frames required rises very rapidly. In fact, it is clear from FIGS. 15 and 16 that for channel conditions with p=90% even with m=16 transceivers (the maximum possible in IEEE 802.15.4) a one in a million error rate cannot be achieved for a 200 sensor node system. To circumvent the effects of temporary fading, frequency hopping may be used in retransmissions. Simple deterministic schemes such as all sensors increasing their channel number by a fixed number may be sufficient. Since sensor nodes are placed within three to fifteen meters of the controller, in most situations most links may be operating near the p=0.99 regime. Even if temporarily a link fades, a change of channel in the next frame will probably provide a good link for the packet to succeed.

Figure 17:
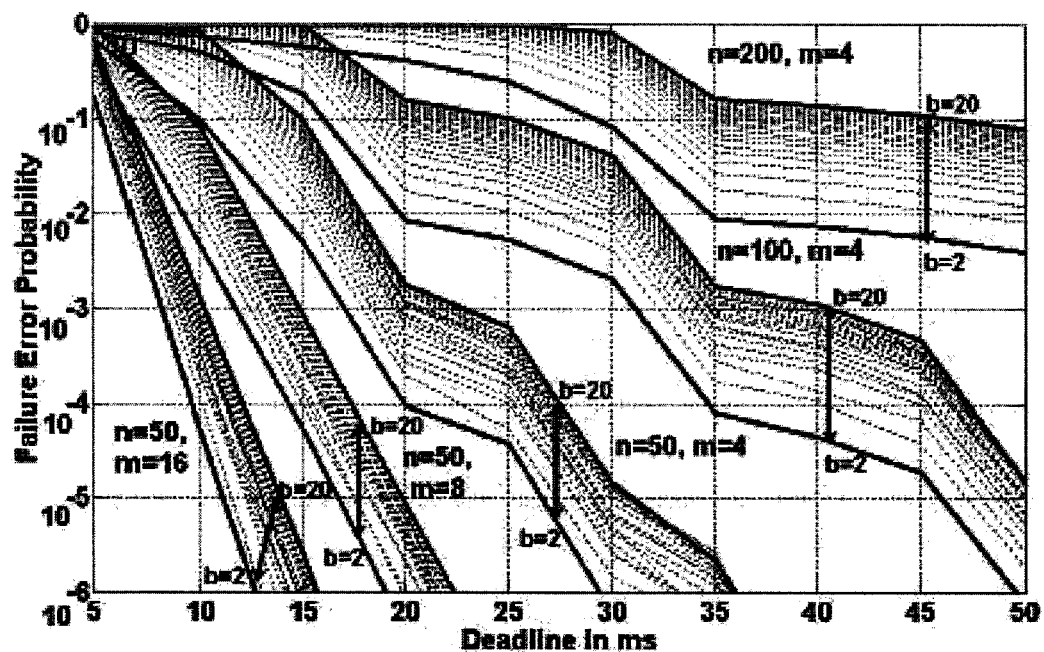
FIG. 17 is a plot of failure probability of FTDMA for p=0.99.
Figure 18:
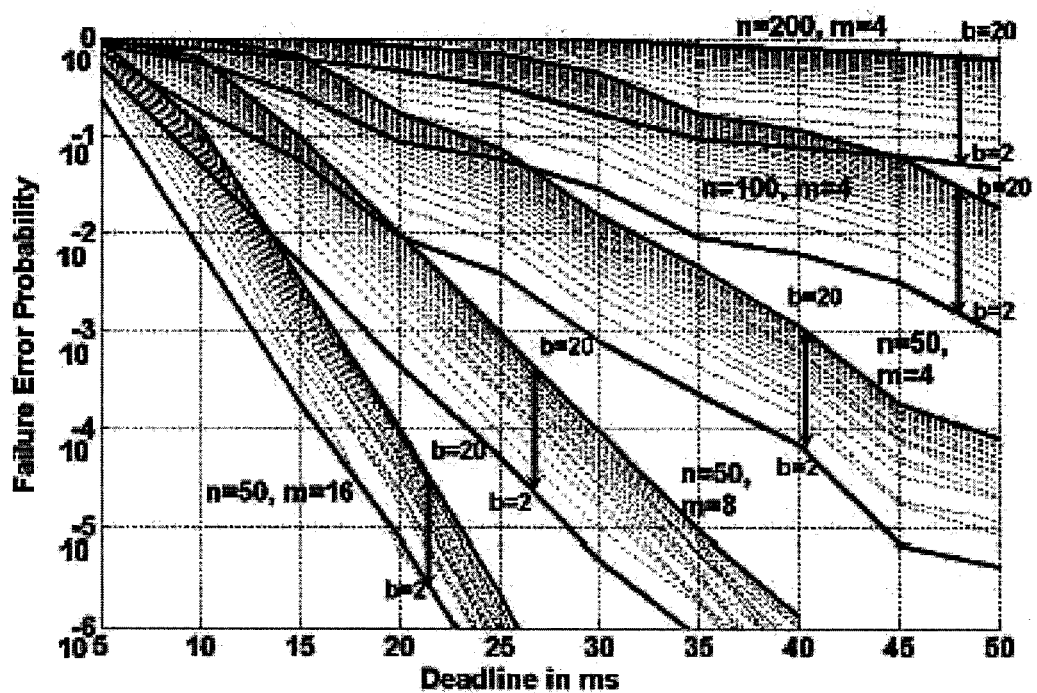
FIG. 18 is a plot of failure probability of FTDMA for p=0.9.

A simulator may be used to evaluate the performance of FTDMA. FIGS. 17 and 18 depict the probability of error of FTDMA for various values of m={4, 8, 16}, b={2, ..., 20}, n={50, 100, 200} and p=0.99, 0.9 for deadlines in the range of five to fifty msec. Each data point in FIGS. 17 and 18 was empirically obtained over ten million sensor burst events. This rather large number of simulations was required to capture events that are as rare as one in a million. Further, 1.5 msec was deducted from the deadline to account for the time required to wake the radio up.

It may be observed that the performance of the MAC depends only on the ratio n/m. In other words, the performance of a 100 node system with four transceivers at the controller may be almost the same as that of a 200 nodes system with eight transceivers at the controller. This should not come as a surprise since the duration of a frame depends significantly only on the ratio n/m. While there is a dependence of the failure probability on the sensor burst size (b) (for example the probability that all four sensors succeed will be less than the probability that two sensors succeed), the dependence is not "significant".

FIG. 17 indicates that a system with 200 sensors may require at least more than eight transceivers at the controller to provide a one in a million error guarantee in a fairly typical channel (p=99%) under 50 msec. Further, even small machines with fifty sensors cannot be engineered with 10 msec or less using 802.15.4 even if all the sixteen channels available are used in parallel to ensure one in a million error probability. As expected in FIG. 18 for p=90%, it is significantly harder to achieve better that a one in a million level of error probabilities. In fact, even with all sixteen transceivers at the controller, only systems with 25 msec deadlines can be catered to.

In order to reduce power consumption and increase longevity, the node radios may be powered off during times of inactivity. There are two major factors that determine the power consumption in a time slotted MAC protocol. The first factor is event frequency, i.e., the frequency of occurrence of events that trigger the sensors to transmit packets. The second factor is time synchronization, i.e., the periodic receipt of time synchronization beacons from the controller to maintain time slots. Each of these sources of power consumption may be considered systematically.

Power may be consumed due to the occurrence of events. When an event occurs, a node may retransmit several times. For each transmission, the sensor may transmit once and receive once. In between re-transmissions, the CC2420 radio can either be put in idle mode or powered down. Each time the radio is powered up, it draws a startup current of about 15 mA for about 500 μsec or about 7.5 μmAsec. If, however, it is set to the idle mode between re-transmissions, it will continuously draw 426 μA during the entire period it is on. Based on these calculations we found that the best strategy is to put the radio in idle mode between re-transmissions but power it off completely between two events, i.e., after receiving an acknowledgement from the controller.

In general the average number of re-transmissions determines this part of the power consumption. The average number of transmissions required by the sensor node to succeed in a channel with a success rate of p is given by $1/p$. Given that acknowledgements may be lost in the channel with a probability p (ignoring that the PSR of the acknowledgement packet is slightly less than a sensor packet since a few bytes larger), the average number of times a sensor node will re-transmit is given by $1/p^2$. One optimization that can be done to avoid the effect of lost acknowledgements is that after receiving a packet from a sensor, the controller continues to acknowledge it for a few successive frames irrespective of whether or not it received a packet in the current frame. Under this scheme, it is trivial to show that the expected number of times a sensor will transmit is given by $2/p$.

The time a radio may be in transmit mode for transmitting is given by 780 μsec, while the time it may be in "receive mode" to receive the acknowledgement packet may be determined by the duration of the acknowledgement slot. Knowing that the CC2420 radio draws 17.4 mA in transmit mode and 19.7 mA in receive mode, the energy drawn per frame may be computed. Considering that the average number of transmissions is $2/p$ which is about equal to two for p values approximately between 0.9 and 0.99, a node may be expected to wait a little over two frames on an average. While the exact power consumption depends on the frame duration, most of the contribution is due to the transmissions of packets and the receptions of the acknowledgements. Considering this, the energy consumption per event can be computed to be around 60 μAsec. If the event frequency is κ events per second per sensor, then the average current drawn will be 60 κμAsec.

Power may be consumed due to time synchronization. Periodic time synchronization beacons may be required to maintain the time synchronization among nodes. For the MSP430 microcontroller, a beacon transmission frequency of roughly once a second is sufficient to ensure an error under 64 μsec. Runtime configuration commands (these are usually not latency critical) can be piggybacked with the periodic beacons from the controller. Since time synchronization beacons can also be lost in the channel, the frequency of these beacons may be at least two to three times higher than the minimum required rate (assuming a good channel). Time of these beacons can be pre-decided, so that the nodes wake up exactly at these times for receiving the beacon. For each beacon, the node must wake up in the receive mode once. Time-synchronization packets are eleven bytes long (with two bytes of time-synch information in the payload). Piggybacking time-synchronization packets with acknowledgements can lead to further power savings. However, in this analysis it is assumed that piggybacking is not used. The duration of the time-synchronization slot is 704 μsec. This entails the node drawing 12.5 μAsec of energy per beacon or at a constant rate of about 40 μA assuming three time synchronization beacons every second. The total power consumption can thus be written as 40+60 κμA.

With regard to the longevity of FTDMA, the longevity of a node in years depends on the capacity of the batteries being used. NiCd AA battery capacities usually range between 650 mAHr to 1000 mAHr, while NiMH batteries can provide between 1400 mAHr and 2900 mAHr. The frequency of occurrence of events in a manufacturing machine typically depends on the throughput of the machine. For example, if a machine manufactures at a rate of one product every ten seconds, an event may be expected roughly every ten seconds per sensor (κ=0.1). Typical machine cycles in manufacturing environments can range between as low as a few seconds to as high as a few minutes. For an event frequency of one event in ten seconds, the average current drawn will be about 46 μA (40+6). For a 1400 mAHr battery, this results in a lifetime of about 3.5 years and about 2.5 years for a high end NiCd battery (1000 mAHr). Although herein is discussed only the feasibility of 802.15.4 and not the effects of sensors, in a practical system sensors may consume much higher energy than the radio itself and may have a dramatic effect on the longevity of the system. The energy expended for time-synchronization may be up to an order of magnitude greater than that consumed due to sensor traffic.

In considering other variations of FTDMA, failure error may be determined by the number of re-transmissions that can be accommodated within the deadline, so it may be asked why time should be wasted by accommodating acknowledgements from the controller. The nodes can simply retransmit as many times as possible within the deadline and stop after the deadline has passed. The controller does not transmit any acknowledgements. This variation of FTDMA may be referred to herein as "FTDMA-B." The frame of FTDMA-B is depicted in FIGS. 14a-b. The savings in frame duration obtained by using FTDMA-B instead of FTDMA, however, are not significant. For example, consider that in a 12.5 msec frame, the acknowledgement slot will typically be around 0.8 msec, which represents a savings of only 6%. FTDMA-B based MAC may, however, provide a much lower longevity than an FTDMA MAC since nodes in FTDMA-B keep re-transmitting even though their packet may have been successfully received at the controller.

Given that FTDMA-B is high in energy consumption, a hybrid approach to FTDMA and FTDMA-B can be implemented where acknowledgements from the controller are transmitted once every few frames rather than every single frame in case of FTDMA. This protocol may be referred to herein as "FTDMA-H," and is illustrated in FIGS. 14*a-b*. FTDMA-H thus has a tunable parameter, i.e., the acknowledgement frequency $\mu_{ack}$ that determines how often the acknowledgements are transmitted from the controller. A $\mu_{ack}$=0.5 signifies that the controller will transmit its acknowledgement once after every two sensor transmissions. FTDMA and FTDMA-B thus form the ends of a continuum in FTDMA-H with $\mu_{ack}$=1 and $\mu_{ack}$=0 respectively. The variations FTDMA-B and FTDMA-H may be useful mechanisms to ensure certain combinations of longevity and error probability guarantees.

While there may be hundreds of sensors in a system, it is unlikely that all the sensors will be triggered at the same time because of an event or a combination of events. In most machines, burst size (number of sensors in a burst) is typically on the order of 220 sensors. The potential advantage of using a contention based scheme then lies in the fact that its performance will depend only on the sensor burst size and not on the actual number of sensors in the system. A contention based scheme may thus perform better than FTDMA for systems with a large number of sensors but small burst sizes.

The performance of any contention based scheme depends on the underlying traffic characteristics. In theory, it may be possible to design a MAC protocol that is specifically tuned to a given underlying traffic model. In practice, however, the underlying sensor traffic characteristics of a machine depends on its construction, its interaction with neighboring machines, its operating conditions, and its environment. In fact, traffic characteristics may themselves change with time as the operating conditions (e.g., high load, low load in case of a manufacturing system) change. In other words, constructing a reasonably accurate traffic model may be in itself quite a challenging problem.

Rather than attempting to estimate the underlying traffic characteristics, the question may be asked, "Given a maximum burst size, what is the error guarantee (in terms of probability that all sensors will succeed in transmitting before the deadline) that can be provided?" The rationale is that any burst that is smaller than the maximum burst size will perform better only in terms of the probability of success. In the strawman approach towards designing the contention based MAC protocol, the aim is to maximize the probability that all the sensors will succeed within the given deadline for a given maximum burst size that may occur in the system.

Contention based MACs can be slotted (where time is divided into time slots) as well as unslotted. In general, slotted MACs perform better in terms of throughout compared to unslotted MACs (for example slotted ALOHA versus its unslotted version). Consequently, the strawman approach to designing a contention based MAC may be limited to slotted MAC protocols.

Clear channel assessment (CCA) forms an important mechanism to avoid wasteful transmissions due to packet collisions in many contention based MACs. In CCA, each node first listens to the wireless channel for potential ongoing transmissions and transmits only if the channel is free to transmit. CCA can potentially help in avoiding wasteful packet collisions. A node performs CCA by listening to the wireless channel to measure the received signal strength (RSS). A high RSS indicates ongoing transmissions, and, typically, if the measured RSS is above a certain threshold the channel is deemed busy, and otherwise not. The RSS being lower than a threshold does not, however, guarantee the absence of ongoing transmissions because of the possibility of a transmitting hidden node (i.e., a node within the radio range of the CCU but not within that of the transmitting node). The effectiveness of CCA in avoiding potential collisions for applications where the sensor packets are very small (e.g., thirteen bytes) is addressed hereinbelow.

Figure 19:
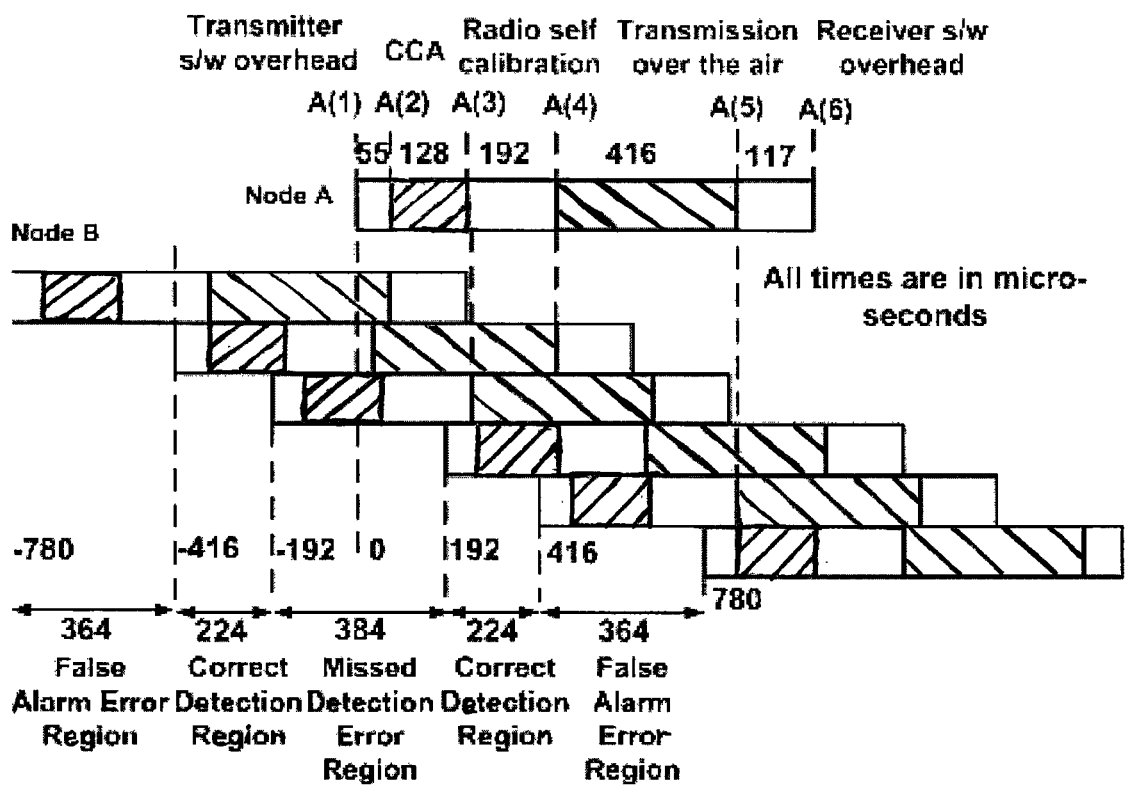
FIG. 19 is an event timeline for a thirteen byte sensor packet.

In CC2420 and other radios, the most efficient strategy to perform CCA is to pre-configure the radio with an RSS threshold in the hardware. Prior to any transmission, the radio samples the channel and transmits only if the RSS is lower than the threshold. A CCA is performed with the transceiver in the receive mode. Thus, in order to transmit after performing the CCA, the radio has to change from receive to transmit mode. To change modes, the transceiver has to self-calibrate which takes 192 μsec for a CC2420 radio. To obtain one sample of RSS, a CC2420 radio averages over a period of 128 μsec. Based on these facts, FIG. 19 depicts the chronology of critical events in such a mechanism for a thirteen-byte sensor packet. It may be illustrated by FIG. 19 that clear channel assessment is not very efficient for small packets. In a first stage, the node begins transmission. In a second stage, the microcontroller transmits a command to the CC2420 radio over SPI 55 μsec. In a third stage, the radio performs CCA 128 μsec. In a fourth stage, the radio self calibrates to transmit mode 192 μsec. In a fifth stage, the radio finishes transmission over the air 416 μsec. In a sixth stage, the packet is received at the receiver 117 μsec.

The efficiency of the CCA mechanism when two nodes A and B transmit simultaneously is analyzed hereinbelow. In FIG. 19 the starting of transmission of Node A is considered as the origin and different starting points for the transmission from Node B are considered. In FIG. 19, A(i) denotes the occurrence of the $i^{th}$ event for node A, for example, B(3) means that Node B has finished CCA. It is assumed that Node A will detect an ongoing transmission from Node B if it is performing CCA (the period between A(2) and A(3)) while Node B is transmitting over the air (the period between B(4) and B(5)).

Consider transmission B's starting times in the interval (−780, −416)μsec. For all these transmissions, Node A's CCA interval overlaps with over the air transmission of Node B. Thus, Node A will infer that there is an ongoing transmission and backoff. However, this would not be a prudent judgment because, if Node A had gone ahead with its transmission ignoring the result of the CCA, there would have been no collision. This is because Node B would have finished its over the air transmission by the time Node A started its over the air transmission. In other words, Node A inferred a collision when there was none to occur. This period of false alarm error lasts 364 μsec long. A similar situation occurs in the interval (416, 780)μsec, when Node B detects Node A's ongoing transmission and backs off unnecessarily. Performing CCA during these time intervals will thus lead to false alarms.

True detection: If Node B transmits in the interval (−416, −192)μsec, Node A will correctly infer an ongoing transmission and avoid a potential collision. The same is true in the region (192, 416)μsec when Node B will detect Node A's transmission and avoid a collision. These may be referred to as regions of true detection.

Missed Detection Error: If Node B transmits in the interval (−192, 192)μsec, Node A and Node B will completely miss detecting each others ongoing transmissions leading to a collision.

The combined period of false detections and false alarms is 1112 μsec (2×364+384) while the duration of correct detections is only 448 μsec (2×224). In other words, the best rate that CCA can correctly detect and avoid collisions is only about 29%. CCA will miss detecting 24% of the time and raise a false alarm about 47% of the time. This is a rather poor result in that it means that the decision taken based on CCA will be incorrect 71% of the time. For radios without the facility for configuring CCA in hardware, the effectiveness of CCA will be further reduced due to software and SPI communication overheads.

The exponential back off based MACs are probably the most ubiquitous contention based MACs. The exponential back off mechanism is not best suited for the goal of maximizing the probability of success of all sensors within a given deadline. In order to determine how much better the MAC will perform compared to the exponential backoff based MACs, it may be assumed that the controller is equipped with m transceivers. Thus, the controller could potentially receive m packets within the same time slot over different channels.

As depicted in FIG. 20, time is divided into slots. Each slot includes a sensor transmission and an acknowledgement transmission from the controller. The acknowledgement packet may contain the identification of the node being acknowledged because it is possible that if two or more nodes transmit in the slot, one of them might be successfully received. The acknowledgement packet is thus eleven bytes long (see FIG. 20).

Each node maintains a window of time slots in which it uniformly randomly selects a time slot for transmitting. While transmitting within a time slot, the node uniformly randomly chooses one of the m channels. It is trivial to show that choosing uniformly randomly among the m available channels is the optimal strategy to maximize the number of successes within the time slot. In case of a collision, the node backs off and the contention window is simply increased by a factor of two.

A strawman approach to building a contention based MAC is started with ALOHA. ALOHA promises the maximum throughput when the number of contenders is exactly known. ALOHA may be trivially extended to accommodate multiple transceivers at the controller. Each time slot of the multichannel ALOHA (MALOHA) is similar to the slot in the exponential back off scheme and includes a sensor transmission and an acknowledgement (see FIG. 20).

In MALOHA (similar to ALOHA), every sensor first decides whether or not to transmit in the current time slot with a probability $\alpha$. Once having decided to transmit in a given time slot, the optimal strategy is to choose one among the m channels uniformly randomly (with a probability of 1/m). It can be shown that the value of $\alpha$ that maximizes the number of successful sensor transmissions in a given time slot when b sensors are contending and the controller has m transceivers is given by $\alpha = m/b$ for $m < b$ $\alpha = 1.0$ for $m \geq b$. Equation (2)

In practice, it may not be possible to estimate the number of contending sensors. Thus, MALOHA uses a conservative strategy which is to use $b_{max}$ for b. Thus, in MALOHA, every sensor transmits in a time slot with a probability $m/b_{max}$ and chooses one of the m channels at random for transmission.

If initially there were $b_{max}$ sensors in the system, with more and more sensors succeeding, the number of contending nodes decreases. The controller may be able to accurately estimate the number of contending sensors and continually convey this information in its acknowledgements to all the sensors.

If the sensor bursts are "sufficiently separated" (100 msec or so), the controller can estimate the maximum possible remaining sensors in the system simply by subtracting the number of sensors that have succeeded from bmax. The controller can indicate this value in its acknowledgement packets so that the sensors can adapt their rates based on this knowledge. The sensors could then adapt their rates accordingly and ensure that the throughput is continuously maximized. This scheme may be referred to as MALOHA-OPT. In practice, however, for some machines it may be hard to guarantee that bursts will always be well separated and it may not be practical to use MALOHA-OPT. MALOHA-OPT may be considered primarily to evaluate a practical upper bound in performance on that could be achieved.

In MALOHA-OPT, the controller transmits an additional byte indicating the number of remaining contending sensors and thus the packet is twelve bytes long (see FIG. 20) in the acknowledgement packet. The nodes use this value for b while computing the value of a for each time slot based on equation (2) above. Acknowledgement packets can, however, be lost in the channel. In the event of the loss of an acknowledgement, the nodes continue with the value of a used in the previous time slot.

All previous contention based MAC protocols have not taken advantage of transmission pipelining. MALOHA can be extended such that time is divided into frames, each consisting of a set of s consecutive transmission pipelined time slots followed by an acknowledgement slot. This scheme may be referred to as transmission pipelined MALOHA (T-MALOHA). The communication pattern of T-MALOHA is depicted in FIG. 20. Each frame in T-MALOHA can be thought of as equivalent to an extended time slot of MALOHA. A node decides whether or not to transmit a packet in a frame with a probability $\alpha$ (as in MALOHA). Once having decided to transmit within a frame, it does so by choosing uniformly from a set of ms time-frequency channels, wherein a and s are not adapted or altered within the period of a single sensor burst. The controller transmits m acknowledgements in the acknowledgement slot as a list of node identifications and hence has a payload of 2s bytes.

Choosing appropriate values of s and a may improve the performance of T-MALOHA. In the absence of an analytical solution, m and s may be determined via an exhaustive search based on simulations. Thus, for each combination of <m, b, p, $\tau$> an exhaustive search may be conducted for the value of <s, $\alpha$> that maximizes the probability that all sensors are successfully received by the deadline. Based on the list of obtained optimal values, it may be found that i) the optimal value of <s, $\alpha$> does not depend on the channel quality p in the range 0.7<p<0.999), ii) the optimal value of s always lies in the range [(b/m), (b/2m)], iii) the optimal value of $\alpha$ is always equal to 1.0, i.e., fixing $\alpha$=1.0 and searching for the value of s is sufficient, iv) the optimal value of s is closer to [b/m] when the deadline is small and increases towards [b/2m] as the deadline increases, and finally, v) for the range of values in the embodiments considered herein, it may be found that the approximation s=max ([b/m], 1) works very well in almost all cases except for 5 and 10 msec deadlines.

Similar to MALOHA-OPT, adaptation of the values of s and $\alpha$ could, in principle, be considered. The controller, in principle, could transmit its estimate of the number of contenders in the channel and the sensors would then choose the appropriate values of s and a in each frame by a pre-computed lookup table. Adapting s has practical limitations since the acknowledgements from the controller may be lost in the channel. All sensor nodes may need to have exactly the same notion of s for the protocol to work. The value of a can however be adapted and several schemes for adapting alpha ($\alpha$) given a fixed value of s have been tried. However, the improvement in performance may be only incremental and not "worth" the additional complexity of the protocol.

The performance of the MACs described hereinbelow may be evaluated on a simulator. Each point may be the result of ten events in the simulator. As in the case of FTDMA, 1.5 msec may be subtracted from each deadline to account for the delay in waking the radio up. It may be assumed that in a sensor burst all sensors are triggered at exactly the same time. This constitutes a harsher scenario than reality where nodes may be triggered at different times within a small interval. FIGS. 21a-c, 22 and 23 depict the dependence of probability of failure on value of the deadline, number of transceivers used at the receiver, and the burst size. Because the dependence of failure probability on b has a large variation, rather than depict every single curve for each value of b (as in FTDMA), the curves for only b=2 and b=20 are shown. The arrows indicate the area that would be covered by the family of performance curves between burst sizes of two and twenty for a given value of m and p.

Figure 21A:
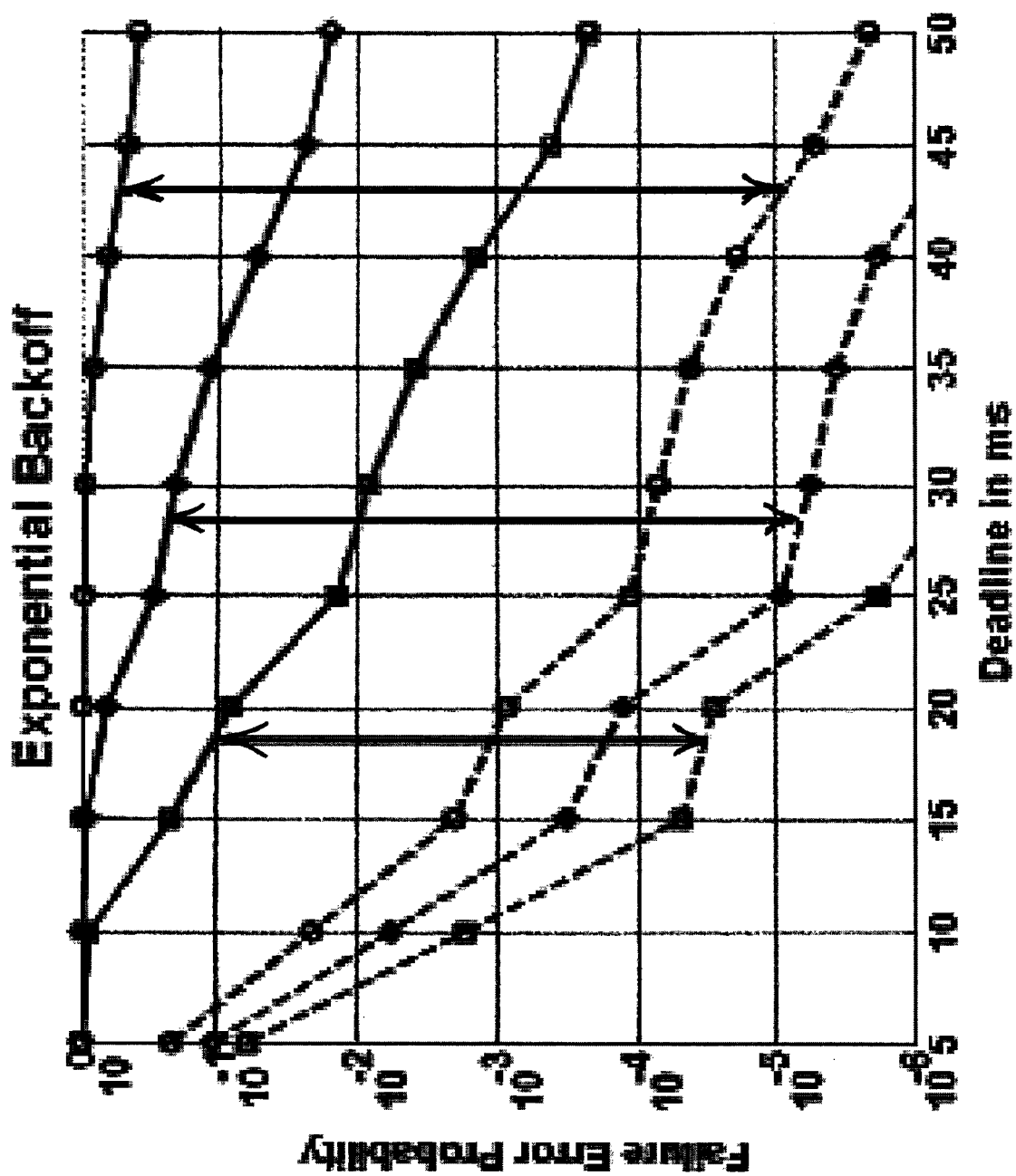
FIG. 21a is a plot of performance of exponential backoff.

As expected, in FIG. 21a, the performance of multichannel exponential back off MAC may be unsuitable given that even with sixteen transceivers (the maximum possible) and a channel success rate (p) of 99%, at the end of 50 msec, the failure rate is above $10^{-6}$ for most burst sizes between two and twenty. Further, it has been found that for channels with packet success rate of 90%, even with sixteen transceivers, and b=2, exponential backoff achieves a failure rate of only $10^{-5}$.

Figure 21B:
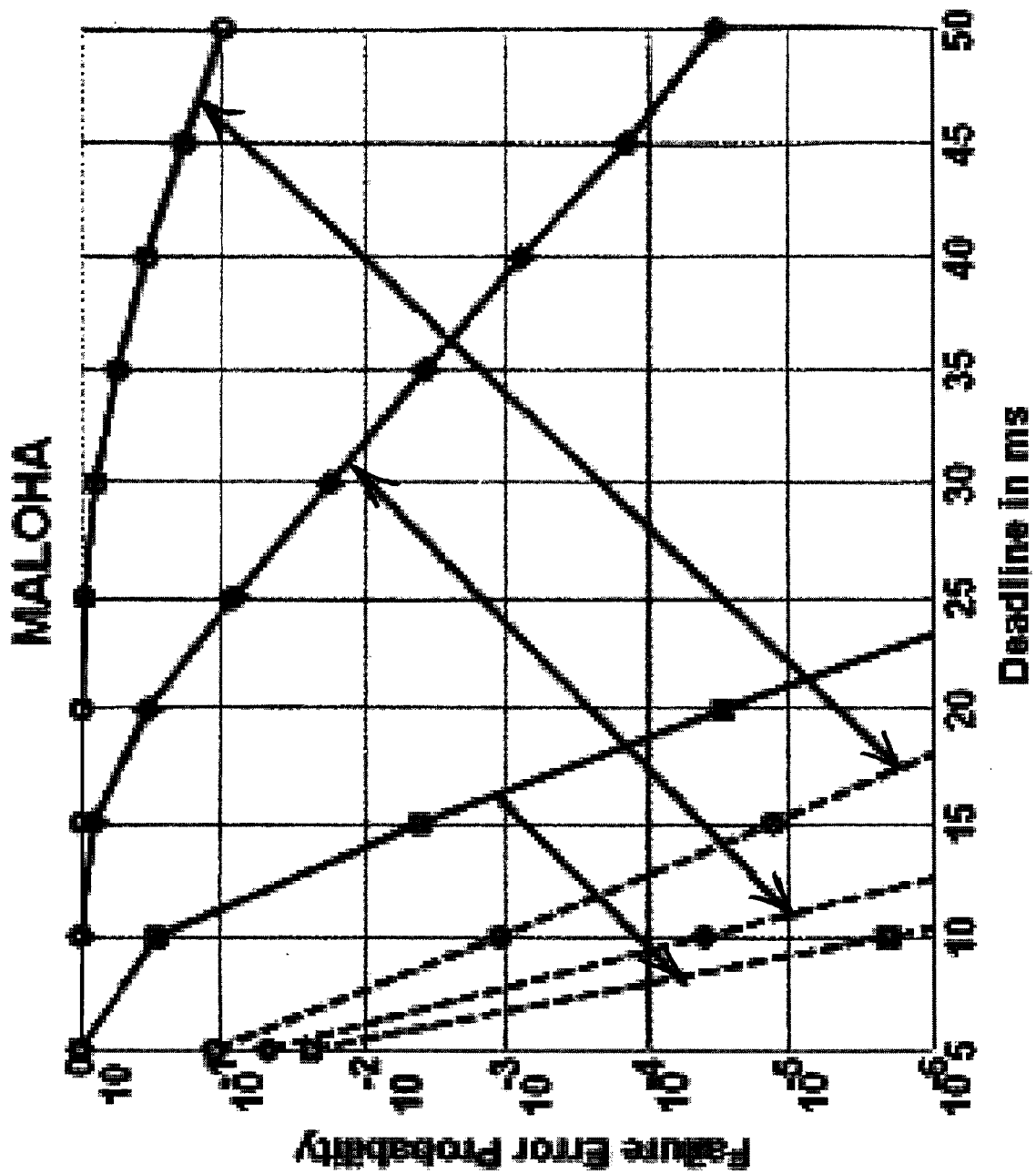
FIG. 21b is a plot of performance of MALOHA.
Figure 21C:
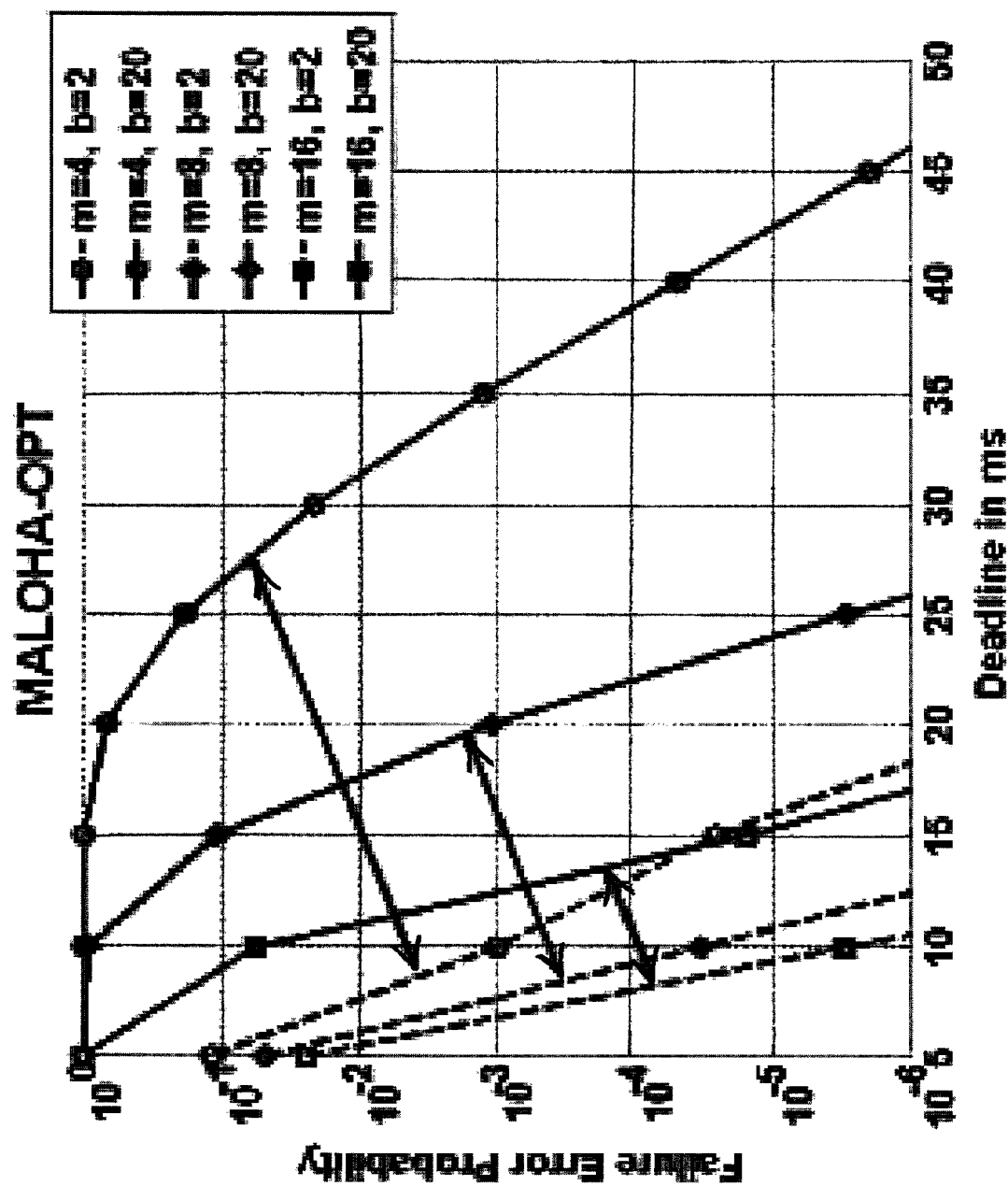
FIG. 21c is a plot of performance of MALOHA-OPT.

The performance of MALOHA depicted in FIG. 21b for a channel with packet success rates of 99% for various values of $b_{max}$ and m is significantly higher than the exponential back off based scheme. For example, with sixteen transceivers at the controller, a $10^{-6}$ error rate can be provided under 20 msec for a burst size as high as twenty. Further improvement is shown in FIG. 21c which depicts the performance of MALOHA-OPT for a channel with p=99%, especially for larger burst sizes.

Figure 22:
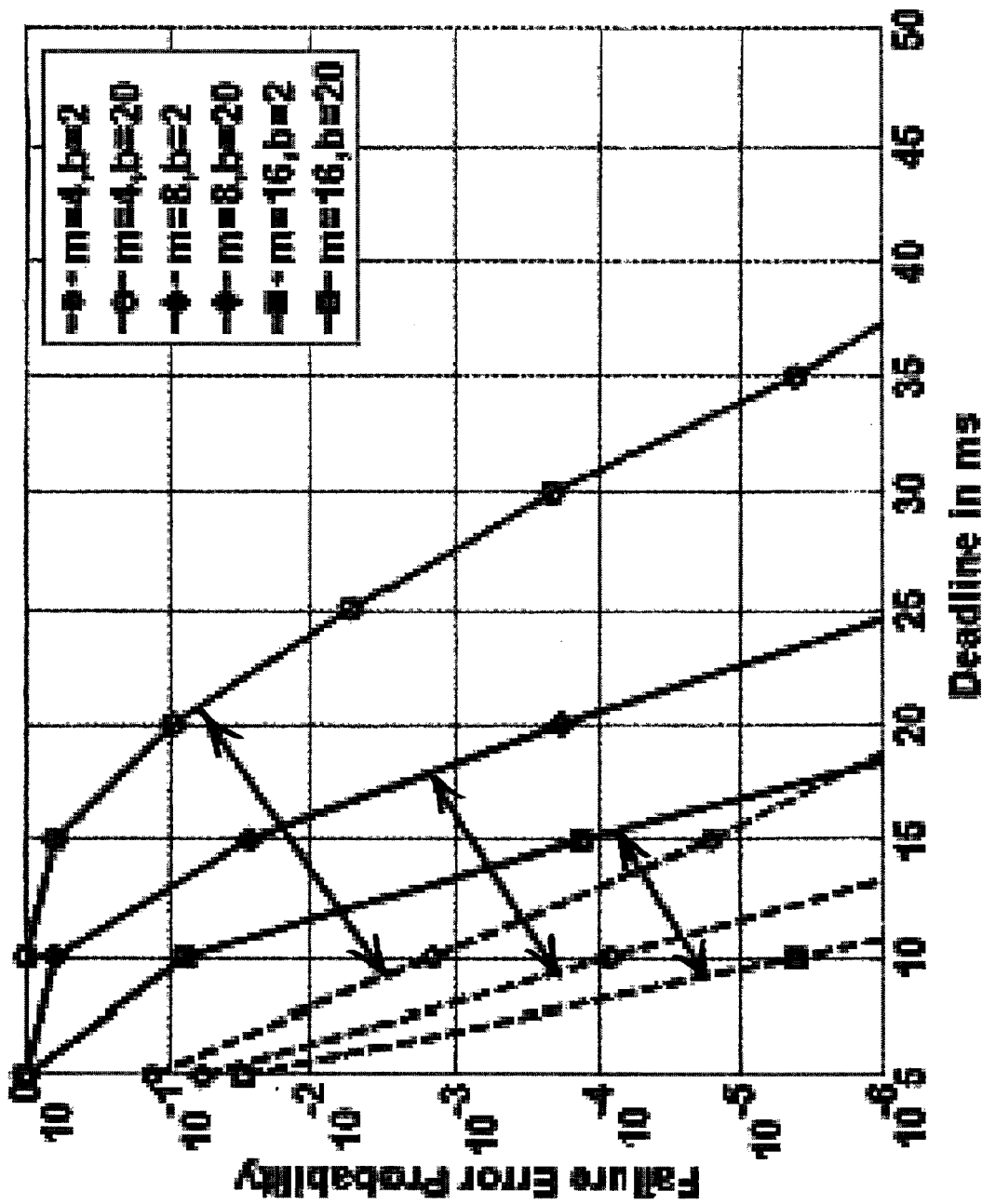
FIG. 22 is a plot of performance of T-MALOHA for p=0.99.
Figure 23:
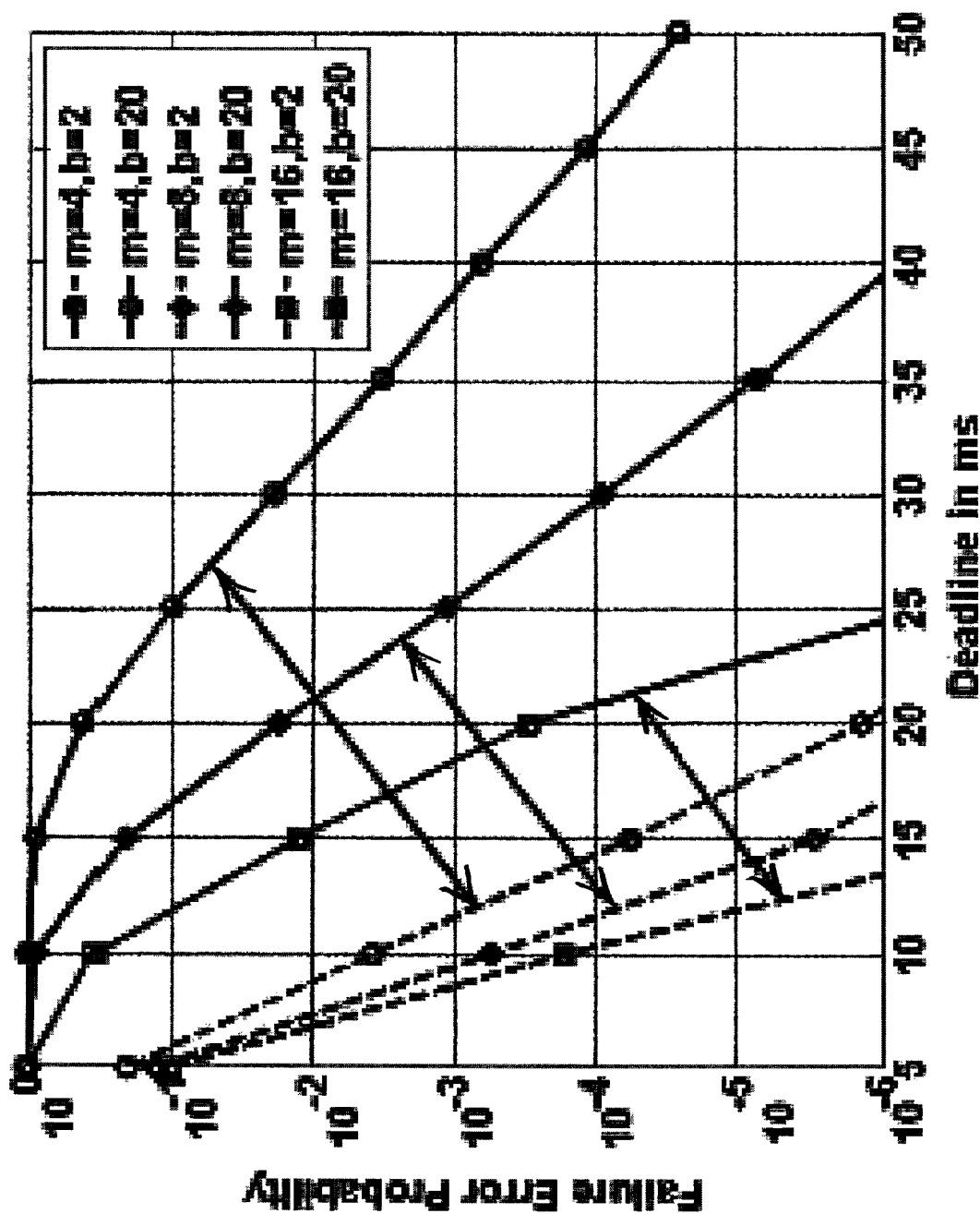
FIG. 23 is a plot of performance of T-MALOHA for p=0.9.
Figure 24:
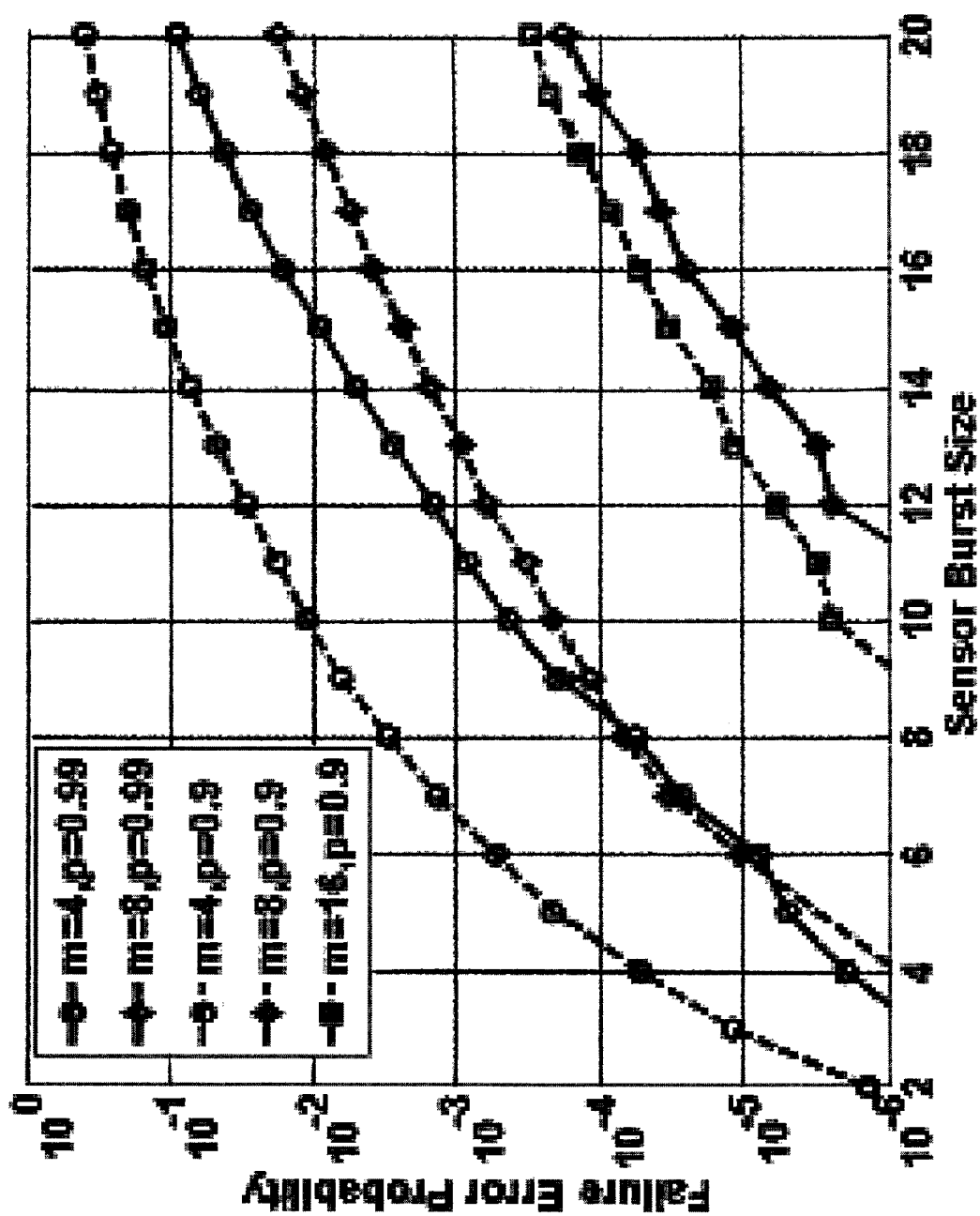
FIG. 24 is a plot of performance of T-MALOHA for a deadline of 20 ms.

The performance of T-MALOHA is depicted in FIGS. 22-24. As shown in FIG. 22, T-MALOHA clearly performs better than MALOHA-OPT for all values of b and m. In fact, using T-MALOHA with four transceivers may be better than using FTDMA based systems for fifty or more nodes and maximum burst sizes under twenty, and thus may provide advantages over FTDMA. Even for channels with a packet success rate of 90%, by using more than four transceivers at the controller, T-MALOHA can provide a $10^{-6}$ error rate. FIG. 24 depicts the dependence of performance on burst size for a deadline of 20 msec. The curve corresponding to m=16 and p=0.99 is not present in FIG. 24 because T-MALOHA provides an error rate of less than $10^{-6}$ for all burst sizes between two and twenty for this deadline. Similarly, with m=8 and p=0.99, systems with burst size under eleven can be guaranteed a $10^{-6}$ error rate.

The energy consumption of contention based MACs may be higher than that of FTDMA since the expected number of re-transmissions may be higher and more energy may be spent in re-transmitting the same packet. In simulations, it has been found that the expected number of re-transmissions varies between three and five depending on channel conditions, burst size, and the number of transceivers at the controller. Considering that the expected number of transmissions for FTDMA systems is about two, the component of power consumption due to events may be 1.5 to 3 times higher. The power consumption due to time synchronization, however, may remain the same. For systems with low event frequency ($\kappa$ around 0.1) the effect on longevity may not be "significant." However, systems with higher event frequencies maybe severely impacted.

FTDMA MACs that use four or more transceivers at the controller may be a suitable option for small systems (50-100 sensors). However, FTDMA may not scale well for larger systems. A contention based MAC, T-MALOHA of the present invention may perform as well as or better than FTDMA systems in terms of error probability for sensor burst sizes under twenty. A drawback of T-MALOHA, however, may be that its longevity could be much lower than that of FTDMA depending on the frequency of occurrence of events. The choice between using FTDMA and T-MALOHA may be based on the tradeoff between i) the size of the system in terms of number of sensors, ii) the burst sizes that may occur, and iii) the frequency of occurrence of sensory events since this may impact T-MALOHA adversely. When the sensory event frequency is "low" (e.g., one event or less per ten seconds) and burst sizes are below twenty, TMALOHA may provide a clear benefit over FTDMA.

Transceiver T-MALOHA and FTDMA systems with m=4 have been empirically implemented on a sensor node platform and deployed in model machines. The platform may use four CC2420 radios for transceivers and four MSP430 microcontrollers (one for each radio). A fifth microcontroller may be used to aggregate the information from each of the four radios.

The present invention has been described herein as being applied to wireless sensors in an assembly line environment. However, it is to be understood that the present invention may be applied to other applications in which multiple wireless transmitters attempt to transmit relatively short messages to a same receiver at approximately the same point in time.

While this invention has been described as having an exemplary design, the present invention may be further modified within the spirit and scope of this disclosure. This application is therefore intended to cover any variations, uses, or adaptations of the invention using its general principles.

What is claimed is:

1. A wireless data transmission method comprising:
   providing a plurality of radio frequency transmitters;
   providing a plurality of receivers to receive transmissions from the transmitters;
   configuring each of the receivers to receive the transmissions on a respective one of a plurality of frequency channels;
   defining a data format including a plurality of transmission time slots;
   causing each of the transmitters to independently select one of the time slots and one of the frequency channels; and
   using the transmitters to transmit the transmissions to the receiver in the independently selected time slots and the independently selected frequency channels,
   wherein, if at least two of the transmitters conflict by transmitting the transmission in a same one of the independently selected time slots and in a same one of the independently selected frequency channels, the method comprises the further step of using the conflicting transmitters to re-transmit the transmissions to the receiver, and
   wherein the method comprises the further step of transmitting acknowledgement codes from the receiver to non-conflicting ones of the transmitters.

2. The method of claim 1 wherein the acknowledgement codes are transmitted to only ones of the non-conflicting transmitters from which the transmissions have been successfully received by the receiver.

3. A wireless data transmission method comprising:
   providing a plurality of radio frequency transmitters;

providing a plurality of receivers to receive transmissions from the transmitters;
configuring each of the receivers to receive the transmissions on a respective one of a plurality of frequency channels;
defining a data format including a plurality of transmission time slots;
causing each of the transmitters to independently select one of the time slots and one of the frequency channels; and
using the transmitters to transmit the transmissions to the receiver in the independently selected time slots and the independently selected frequency channels,
wherein, if at least two of the transmitters conflict by transmitting the transmission in a same one of the independently selected time slots and in a same one of the independently selected frequency channels, the method comprises the further step of using the conflicting transmitters to re-transmit the transmissions to the receiver, and
wherein the method comprises the further step of causing each of the conflicting transmitters to at least one of independently re-select one of the time slots and independently re-select one of the frequency channels, the conflicting transmitters being used to re-transmit the transmissions to the receiver in at least one of the independently re-selected time slots and the independently re-selected frequencies.

4. A wireless data transmission method comprising:
providing a plurality of radio frequency transmitters;
providing a plurality of receivers to receive transmissions from the transmitters;
configuring each of the receivers to receive the transmissions on a respective one of a plurality of frequency channels;
defining a data format including a plurality of transmission time slots;
causing each of the transmitters to independently select one of the time slots and one of the frequency channels; and
using the transmitters to transmit the transmissions to the receiver in the independently selected time slots and the independently selected frequency channels,
wherein the time slots are selected by the transmitters such that the selected times are substantially evenly distributed over a time period.

* * * * *